US010223182B2

(12) United States Patent
Takahashi

(10) Patent No.: US 10,223,182 B2
(45) Date of Patent: Mar. 5, 2019

(54) COMMUNICATION DEVICE, COMMUNICATION SYSTEM, AND COMPUTER PROGRAM PRODUCT

(71) Applicant: Kabushiki Kaisha Toshiba, Minato-ku (JP)

(72) Inventor: Ririka Takahashi, Setagaya (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 481 days.

(21) Appl. No.: 14/885,234

(22) Filed: Oct. 16, 2015

(65) Prior Publication Data

US 2016/0197723 A1 Jul. 7, 2016

(30) Foreign Application Priority Data

Jan. 6, 2015 (JP) ................................. 2015-000878

(51) Int. Cl.
*H04L 9/08* (2006.01)
*G06F 11/07* (2006.01)
*H04L 29/06* (2006.01)

(52) U.S. Cl.
CPC ........ *G06F 11/0709* (2013.01); *H04L 9/0855* (2013.01); *H04L 63/061* (2013.01)

(58) Field of Classification Search
CPC .. G06F 11/0709; G06F 11/076; H04L 9/0855; H04L 63/061

(Continued)

(56) References Cited

U.S. PATENT DOCUMENTS 7,035,411 B2 * 4/2006 Azuma .................. B82Y 10/00
380/256
7,460,670 B1 * 12/2008 Elliott ................... H04L 9/0858
380/255

(Continued)

FOREIGN PATENT DOCUMENTS

JP 2014-22898 2/2014
JP 2014-103514 6/2014

OTHER PUBLICATIONS

Mehrdad Dianati et al. "Architecture and Protocols of the Future European Quantum Key Distribution Network", Security and Communication Networks, vol. 1, 2008, 18 pages.

(Continued)

*Primary Examiner* — Jason K Gee
*Assistant Examiner* — Dereena T Cattungal
(74) *Attorney, Agent, or Firm* — Oblon, McClelland, Maier & Neustadt, L.L.P.

(57) ABSTRACT

According to an embodiment, a communication device is connected with external devices by quantum communication channels and a classical communication channel, and generates an encryption key with photons exchanged over the quantum communication channel. The communication device includes an acquirer, a calculator, a selector, and a communicating unit. The acquirer is configured to acquire a quantum error rate for each quantum communication channel. The calculator is configured to calculate a metric of a first path to each external device based on the quantum error rate. The selector is configured to select a second path in the classical communication channel to a specific one of the external devices based on the metric. The communicating unit is configured to transmit an application key to the specific one of the external devices over the second path.

14 Claims, 22 Drawing Sheets

(58) Field of Classification Search
USPC .......................................................... 380/255
See application file for complete search history.

(56) References Cited

U.S. PATENT DOCUMENTS

| | | | | |
|---|---|---|---|---|
| 7,515,716 | B1* | 4/2009 | Elliott | H04L 9/0858 |
| | | | | 380/256 |
| 7,706,535 | B1* | 4/2010 | Pearson | H04L 9/0855 |
| | | | | 380/255 |
| 8,855,316 | B2* | 10/2014 | Wiseman | H04L 9/0852 |
| | | | | 380/277 |
| 2003/0002674 | A1* | 1/2003 | Nambu | H04L 9/0852 |
| | | | | 380/256 |
| 2006/0093143 | A1* | 5/2006 | Maeda | H04L 9/0852 |
| | | | | 380/256 |
| 2007/0087756 | A1* | 4/2007 | Hoffberg | G06Q 10/0631 |
| | | | | 455/450 |
| 2013/0325395 | A1* | 12/2013 | Zhou | G01B 11/02 |
| | | | | 702/155 |
| 2014/0023192 | A1 | 1/2014 | Tanizawa et al. | |
| 2014/0143443 | A1 | 5/2014 | Takahashi et al. | |
| 2016/0234017 | A1* | 8/2016 | Englund | H04B 10/70 |

OTHER PUBLICATIONS

Christian Kollmitzer et al. "Applied Quantum Cryptography", Lecture Notes in Physics, vol. 797, 2010, 217 pages.

* cited by examiner

QBER

COUNT RATE

○ :NODE NUMBER
☐ :QBER/COUNT RATE

○ :NODE NUMBER
☐ :QBER/COUNT RATE

○ :NODE NUMBER
□ :QBER/COUNT RATE

○ :NODE NUMBER
□ :QBER/COUNT RATE

○ :NODE NUMBER
□ :QBER/COUNT RATE

○ :NODE NUMBER
□ :QBER/COUNT RATE

○ :NODE NUMBER
□ :QBER/COUNT RATE

○ :NODE NUMBER
□ :COST

FIG.22
(a) 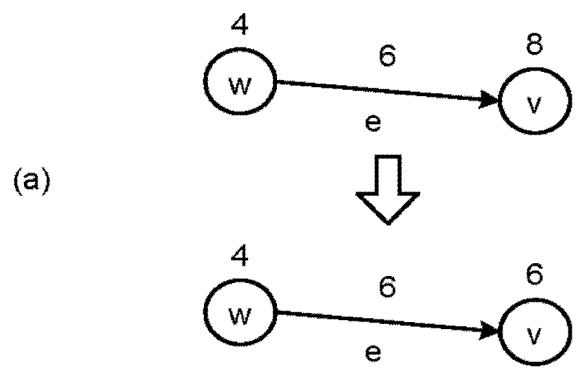
(b) 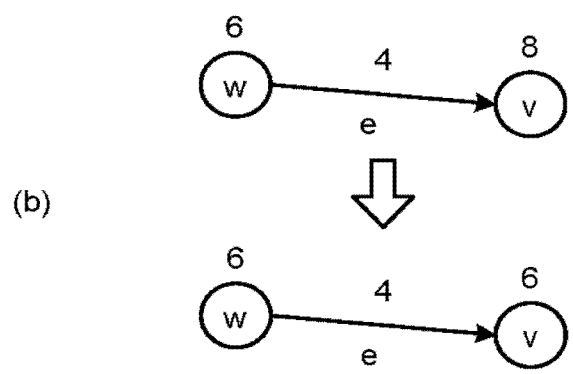
(c) 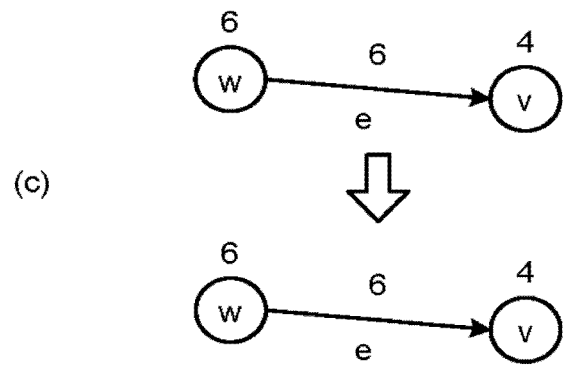

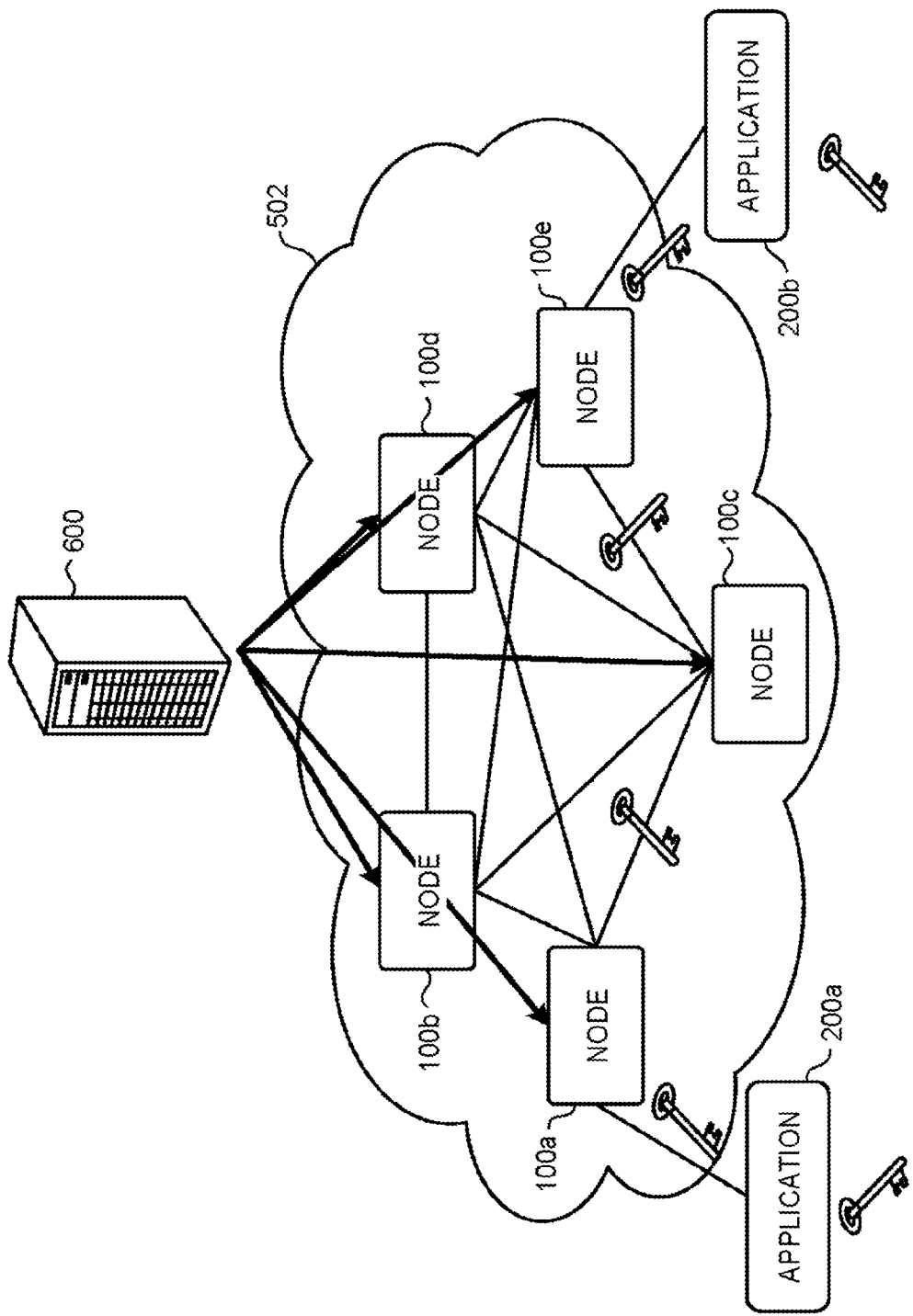

COMMUNICATION DEVICE, COMMUNICATION SYSTEM, AND COMPUTER PROGRAM PRODUCT

CROSS-REFERENCE TO RELATED APPLICATION

This application is based upon and claims the benefit of priority from Japanese Patent Application No. 2015-000878, filed on Jan. 6, 2015; the entire contents of which are incorporated herein by reference.

FIELD

Embodiments described herein relate generally to a communication device, communication system, and a computer program product.

BACKGROUND

Known is a key-sharing network including a plurality of networked nodes that are interconnected to each other over a plurality of links. Each of such nodes has a function for generating and sharing a random number with another node connected over a link (quantum communication channel), and a function for establishing encrypted communication over a link (classical communication channel) using the generated random number as an encryption key (hereinafter, referred to as a link key). Some of the nodes have a function for generating an encryption key (hereinafter, referred to as an application key) that is a random number, independently from any link, and for routing and sharing the generated application key to and with another node over a link (classical communication channel). The function of generating and sharing a link key with another node connected over a link (quantum communication channel) is typically implemented in nodes using a technology called quantum key distribution (QKD).

To suppress depletion of link keys to be generated by nodes in a key-sharing network, disclosed is a technology for calculating a metric of each of a plurality of paths (routes to another node, using number of link keys generated for each link as a cost, and selecting the optimal path to that node.

However, if there is any eavesdropper on the quantum communication channel, and the eavesdropper steals the link key shared via the quantum key distribution, the eavesdropper can also steal (decrypt) an application key, because the application key used for encrypted communication is encrypted using the link key. In the encrypted communication in which data encrypted with an application key is exchanged over a classical communication channel, once an eavesdropper steals the application key, the eavesdropper can decrypt and steal the data. When an eavesdropper observes photons exchanged over the quantum communication channel, however, the states of the photons change, and the node receiving the photons can detect that the eavesdropper has observed the photons, based on the uncertainty principle that is the fundamental principle of the quantum mechanics. While such detection can discard the link key possibly having been eavesdropped, it is also preferable to route application keys by avoiding a classical communication channel that follows the same path as the quantum communication channel having possibly been eavesdropped. This is because, if an application key is encrypted using a link key that is not a one-time pad, an eavesdropper can steal the data exchanged over encrypted communication even with the application key encrypted and routed using a link key having not been eavesdropped.

While the disclosed technology mentioned above can select a path over a classical communication channel so that the depletion in the generated link keys is prevented, this technology has lacked a viewpoint of avoiding a link with a classical communication channel having been possibly eavesdropped by an eavesdropper. Furthermore, if a quantum communication channel and a classical communication channel are multiplexed onto one optical fiber with wavelength division multiplex (WDM), an application key may be stolen in the wavelength band of the classical communication via the optical fiber. In such a case, photons exchanged over the quantum communication channel may also be affected, and increase the error rate.

Figure 7:
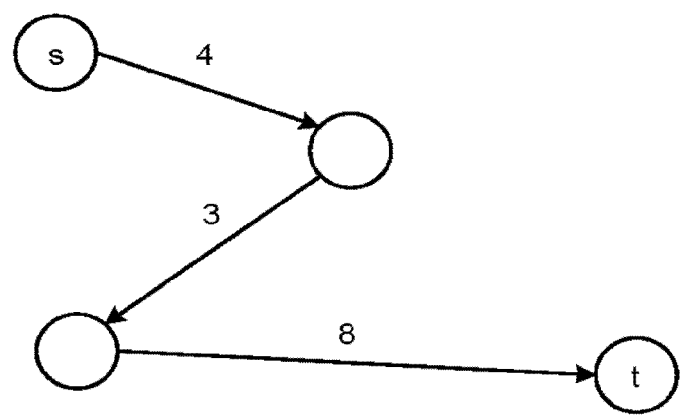
Figure 8:
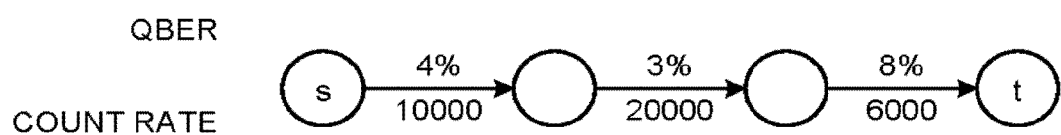
Figure 9:
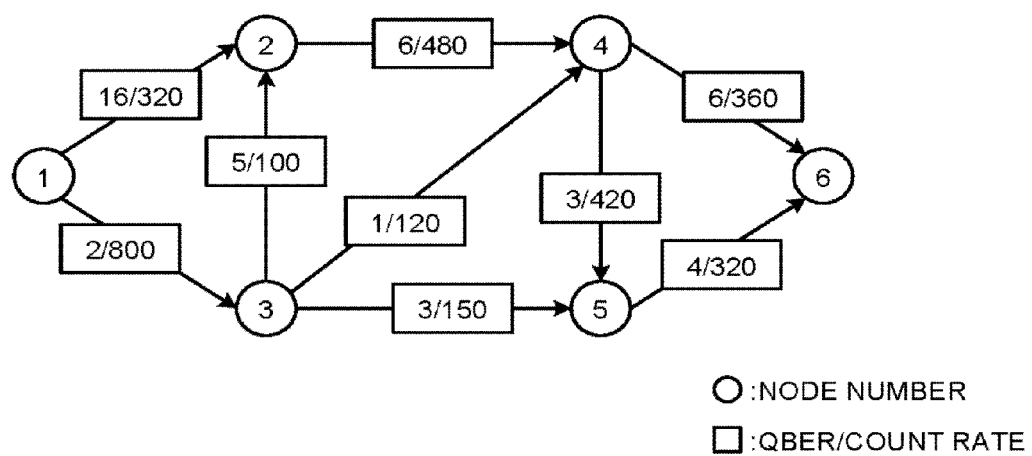
Figure 10:
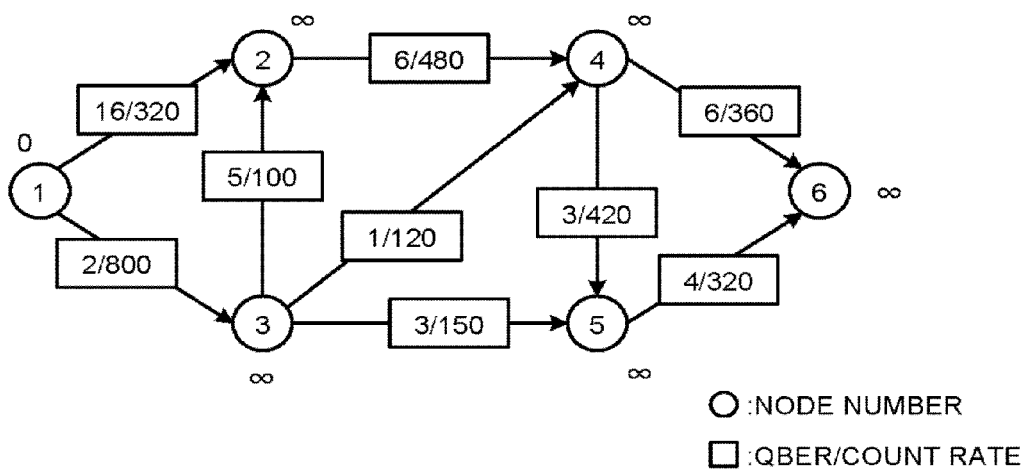
Figure 11:
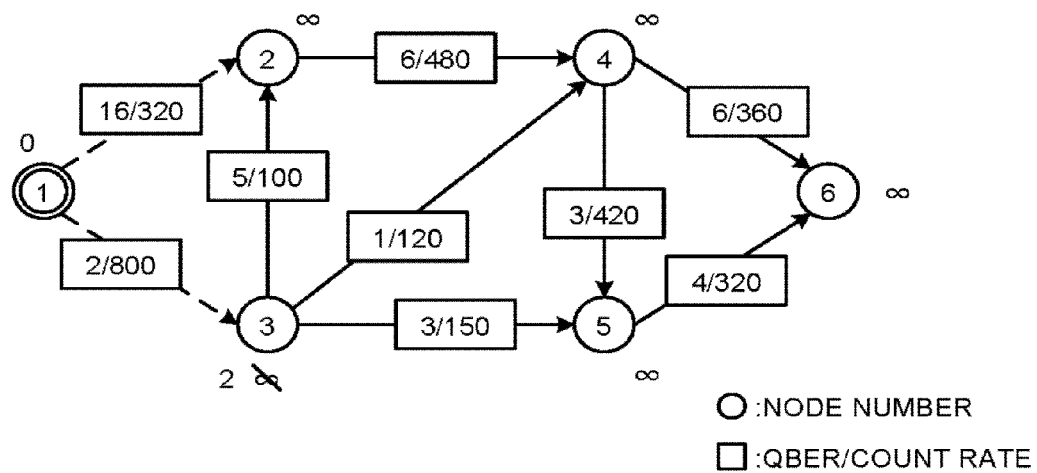
Figure 12:
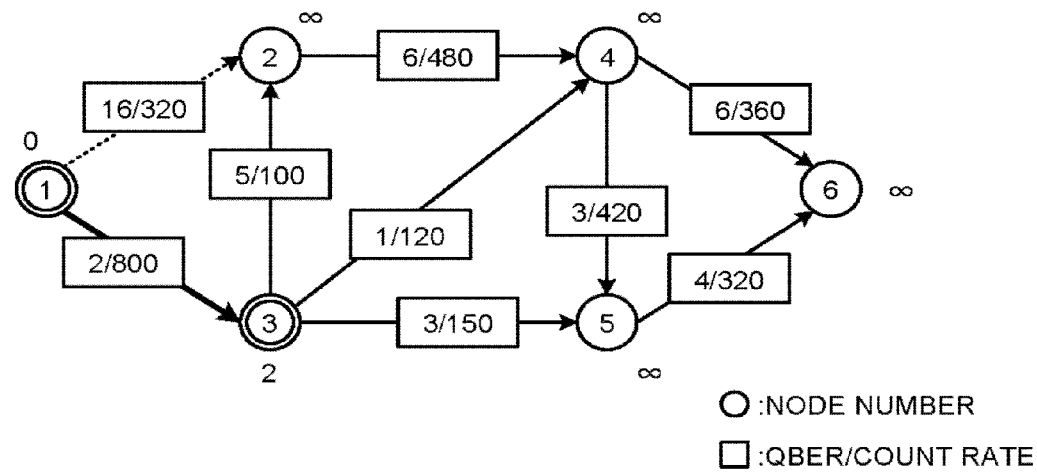
Figure 13:
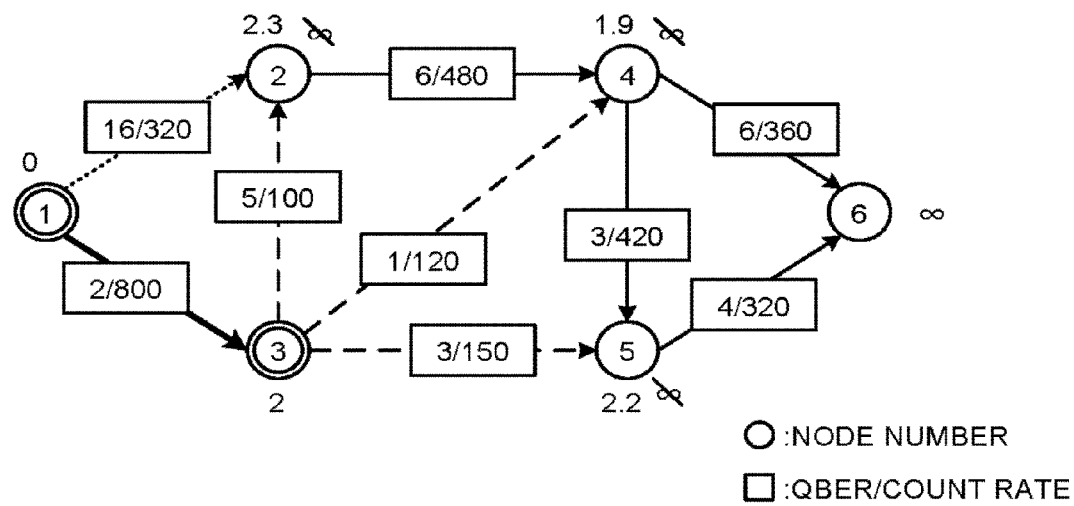
Figure 14:
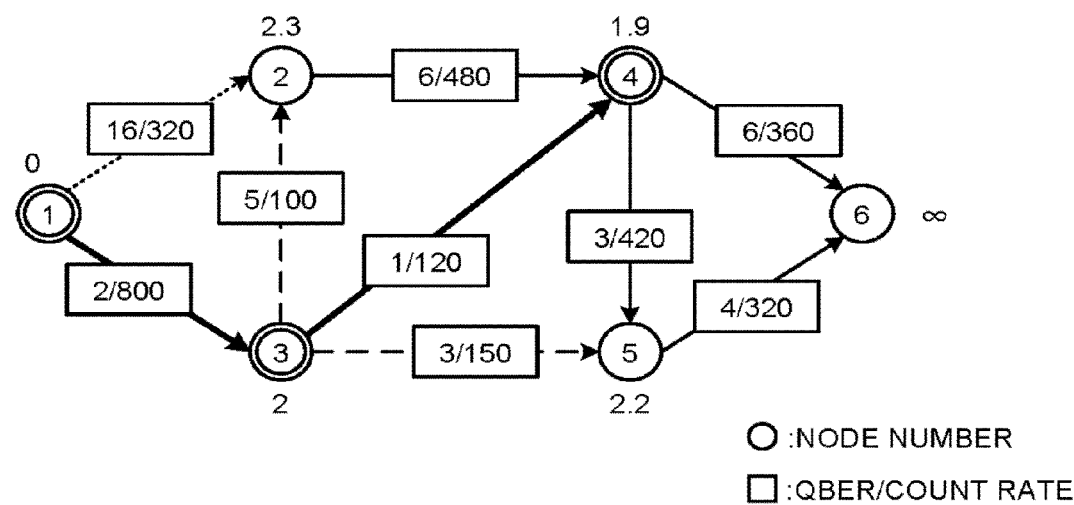
Figure 15:
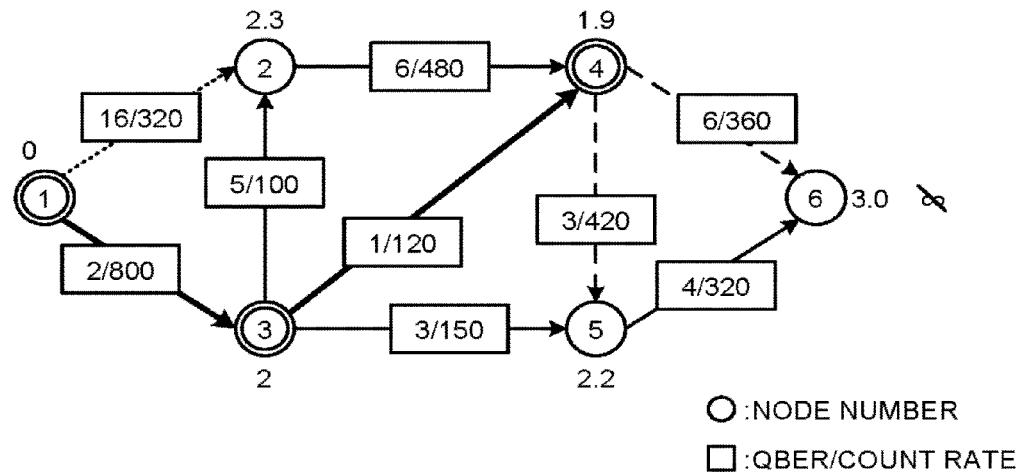
Figure 16:
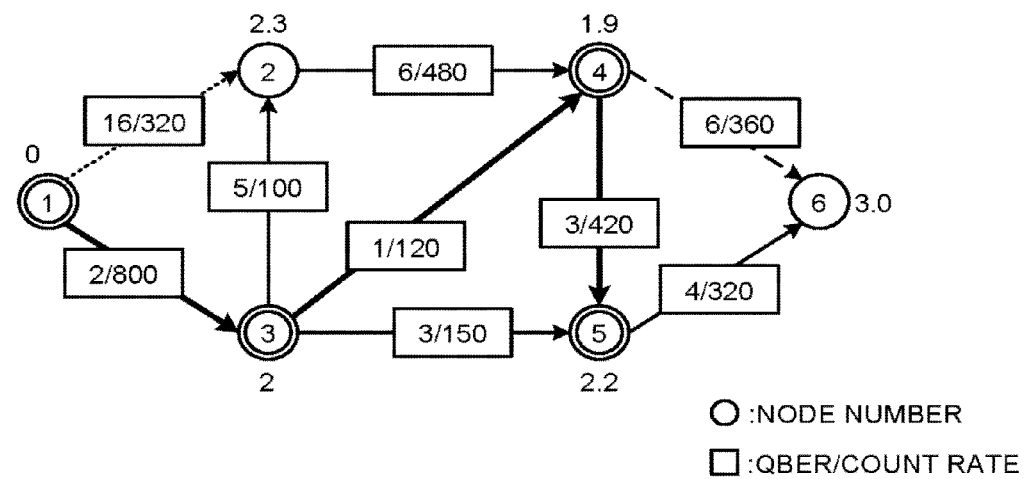
Figure 17:
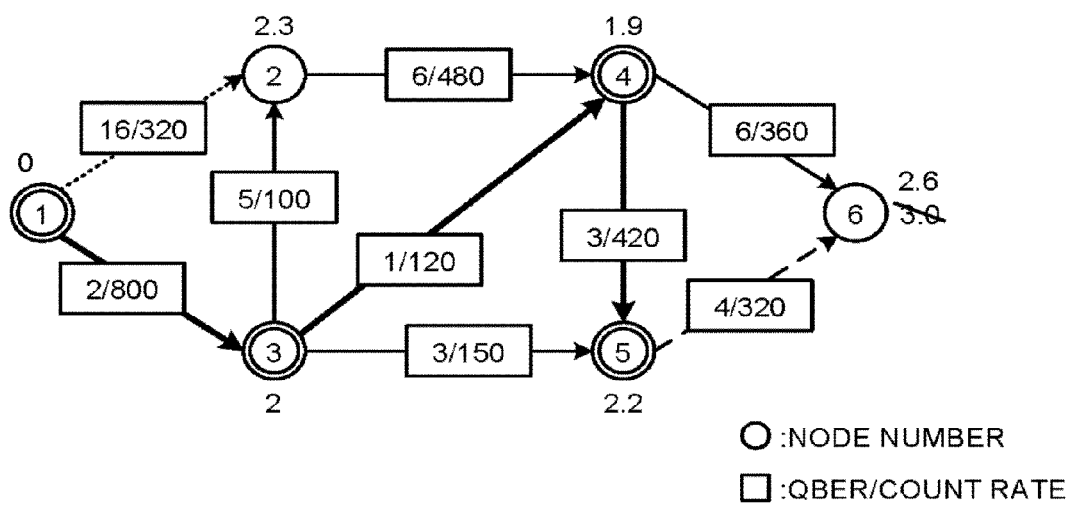
Figure 18:
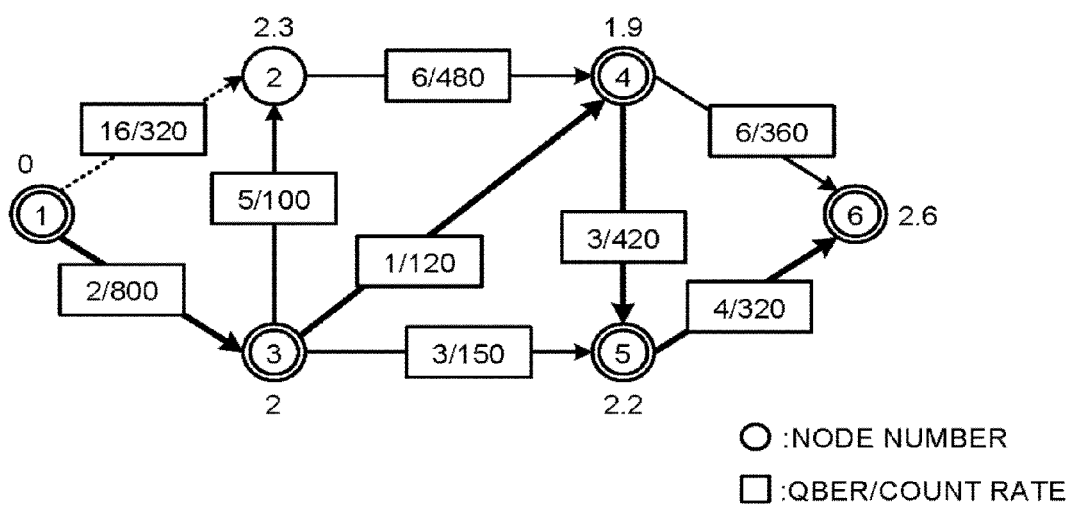
Figure 19:
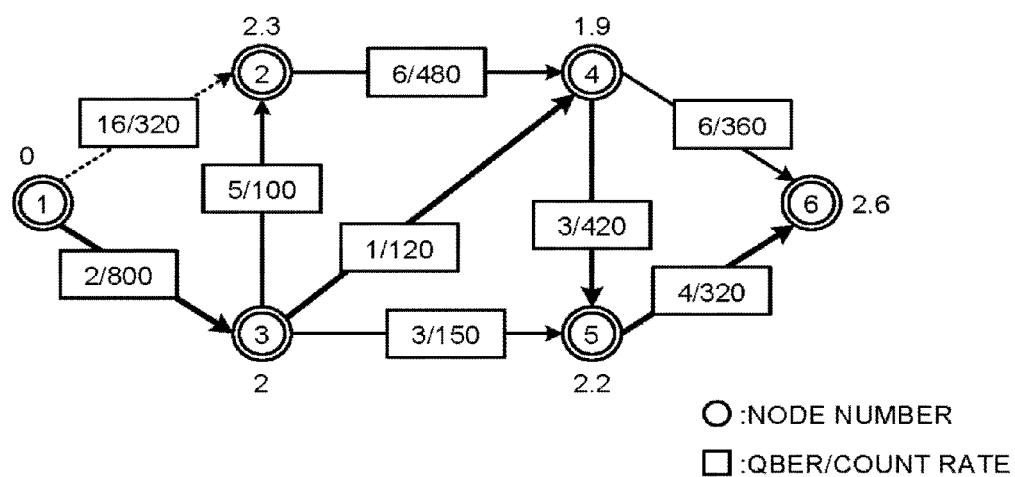
Figure 20:
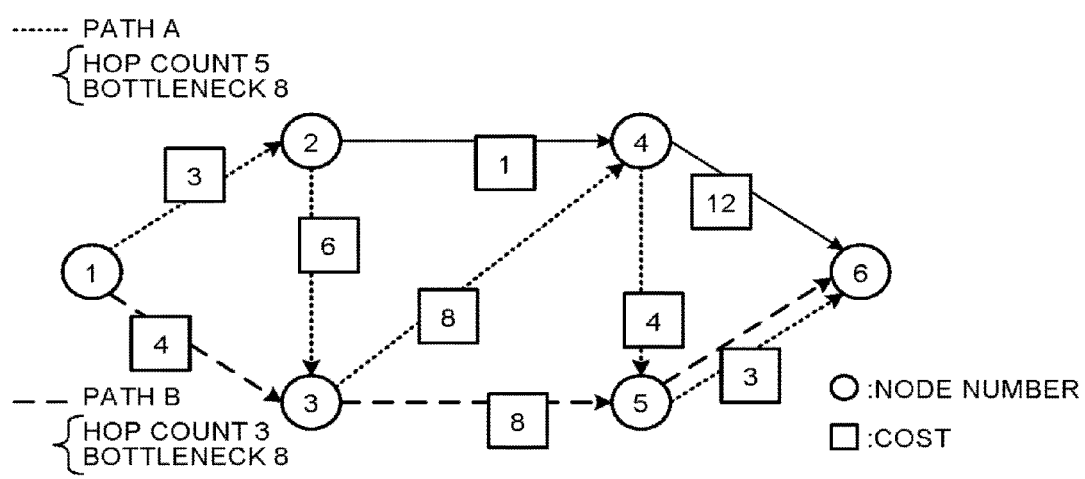
Figure 21:
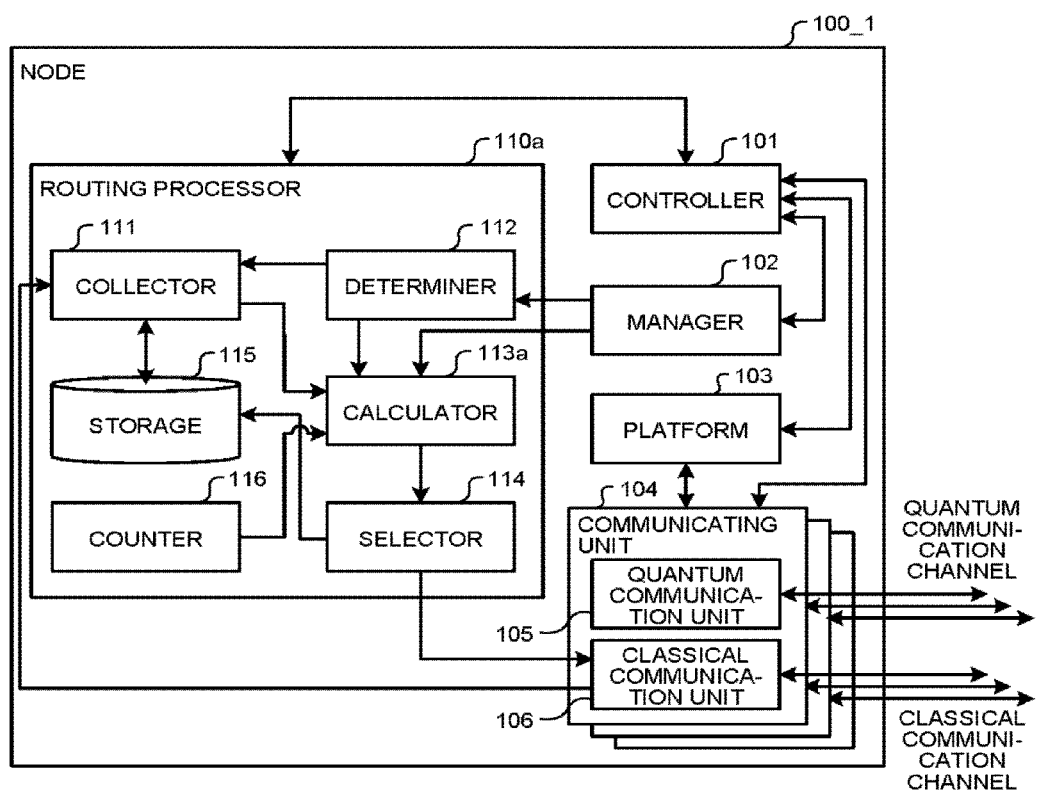
Figure 23:
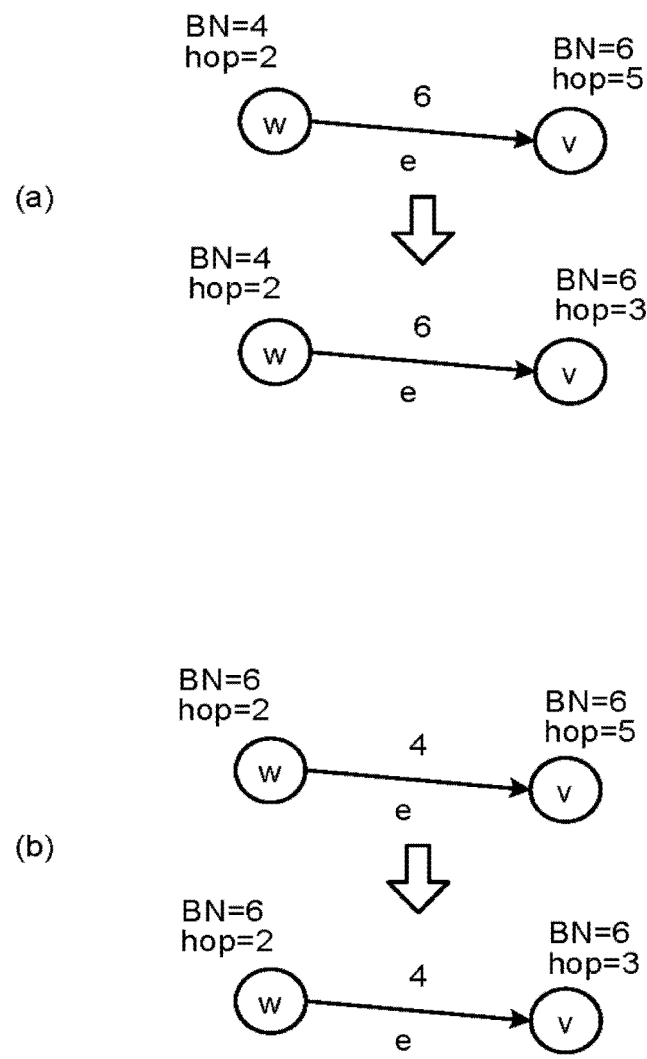
Figure 24:
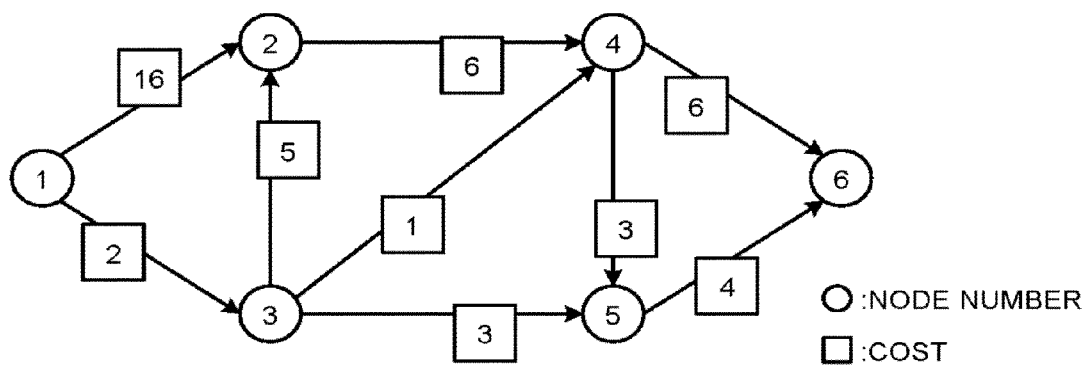
Figure 25:
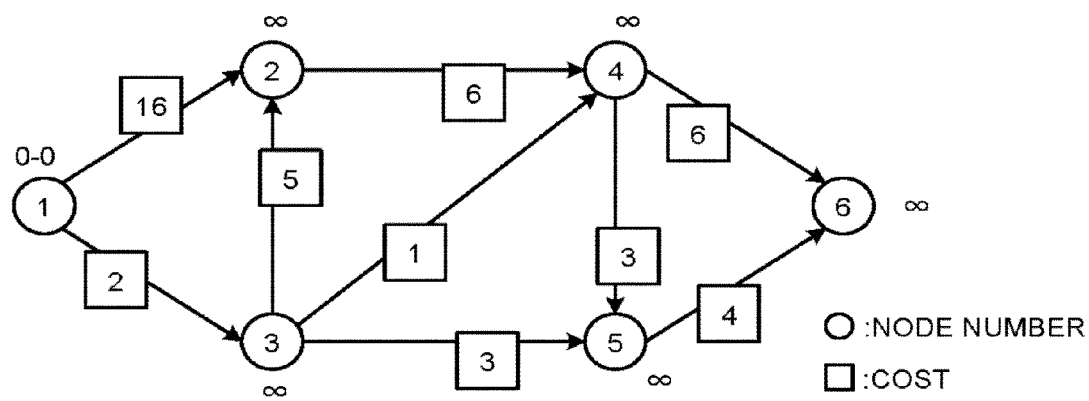
Figure 26:
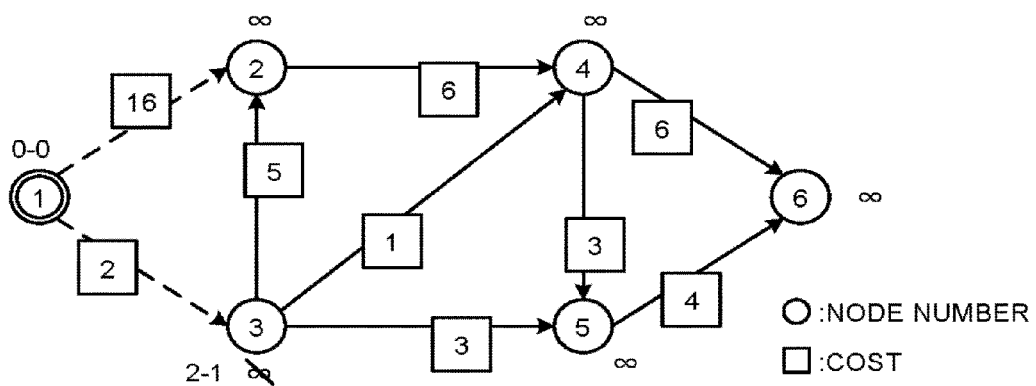
Figure 27:
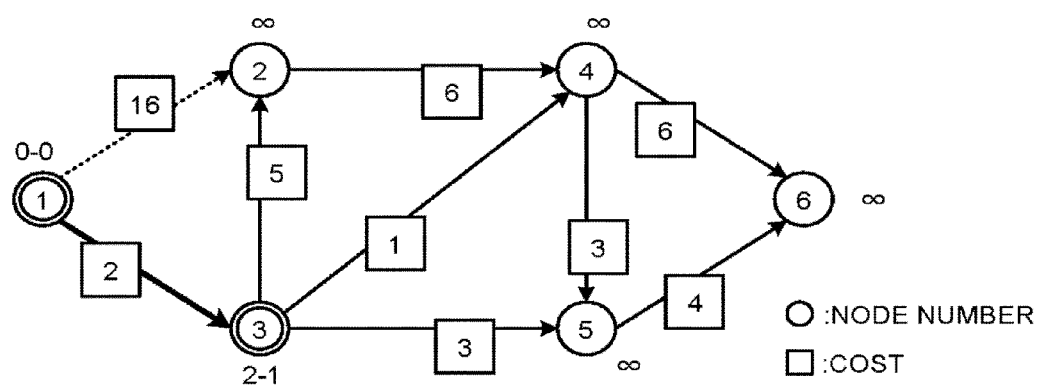
Figure 28:
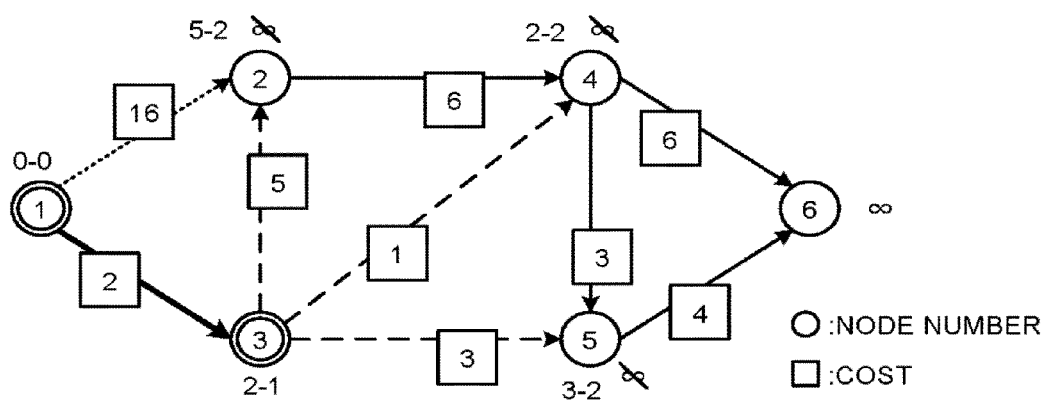
Figure 29:
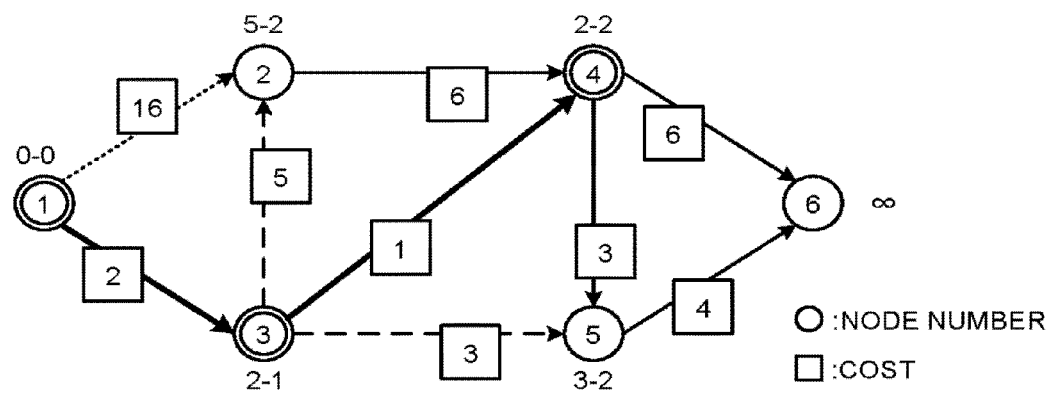
Figure 30:
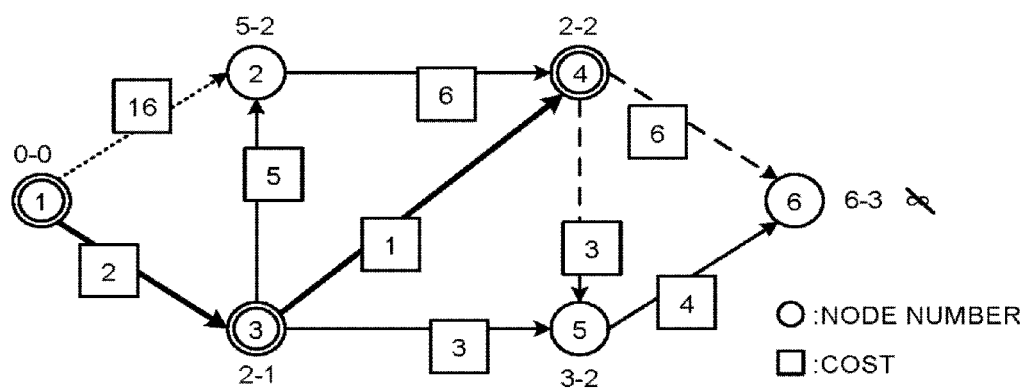
Figure 31:
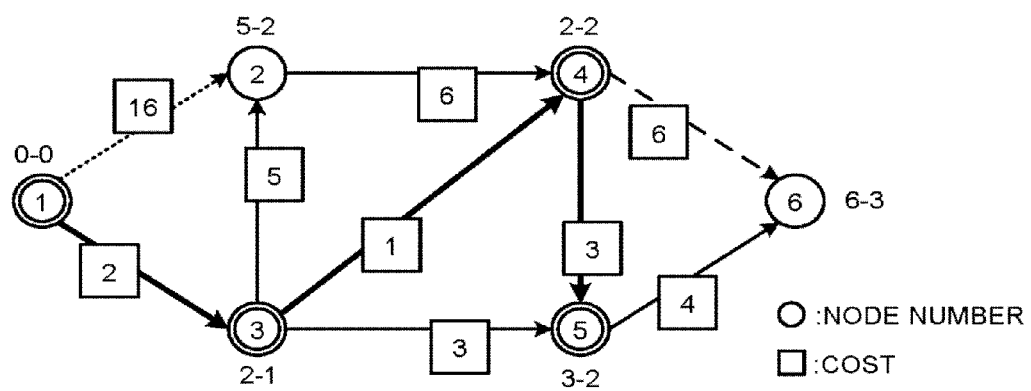
Figure 32:
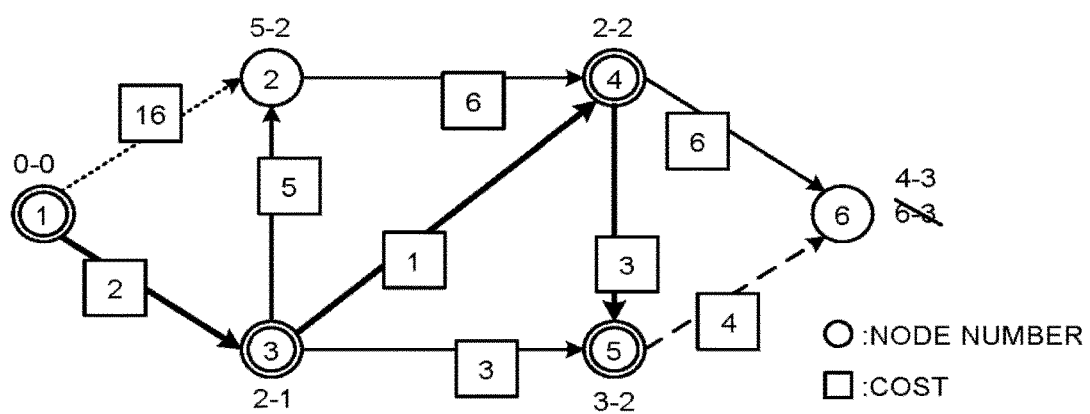
Figure 33:
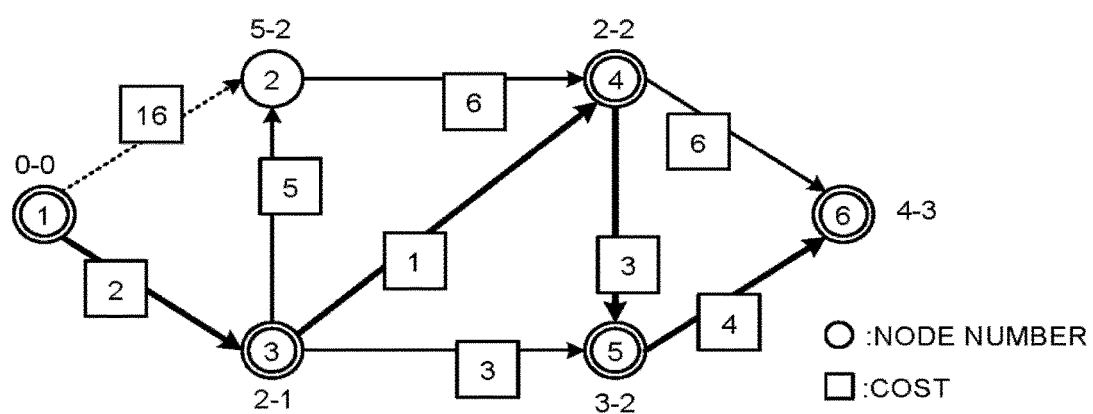
Figure 34:
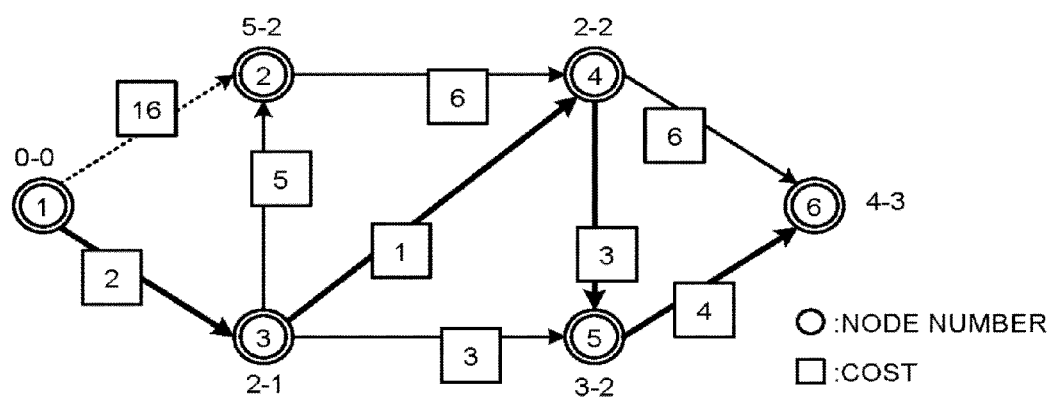

FIG. P is a schematic of a configuration of functional blocks in the communication device according to the first embodiment;

FIG. 7 is a schematic for explaining a metric;

FIG. 8 is a schematic for explaining how an average quantum bit error rate (QBER) is calculated in a fourth embodiment;

FIG. 9 is a schematic of an exemplary network configuration according to the fourth embodiment;

FIG. 10 is a schematic illustrating a routing process according to the fourth embodiment;

FIG. 11 is another schematic illustrating the routing process according to the fourth embodiment;

FIG. 12 is another schematic illustrating the routing process according to the fourth embodiment;

FIG. 13 is another schematic illustrating the routing process according to the fourth embodiment;

FIG. 14 is another schematic illustrating the routing process according to the fourth embodiment;

FIG. 15 is another schematic illustrating the routing process according to the fourth embodiment;

FIG. 16 is another schematic illustrating the routing process according to the fourth embodiment;

FIG. 17 is another schematic illustrating the routing process according to the fourth embodiment;

FIG. 18 is another schematic illustrating the routing process according to the fourth embodiment;

FIG. 19 is another schematic illustrating the routing process according to the fourth embodiment;

FIG. 20 is a schematic of a comparative example of a hop count of a path according to a fifth embodiment;

FIG. 21 is a schematic of a configuration of functional blocks in the communication device according to the fifth embodiment;

FIG. 22 illustrates a routing algorithm according to the fifth embodiment;

FIG. 23 illustrates the routing algorithm according to the fifth embodiment;

FIG. 24 is a schematic of an exemplary network configuration according to the fifth embodiment;

FIG. 25 is a schematic illustrating a routing process according to the fifth embodiment;

FIG. 26 is another schematic illustrating the routing process according to the fifth embodiment;

FIG. 27 is another schematic illustrating the routing process according to the fifth embodiment;

FIG. 28 is another schematic illustrating the routing process according to the fifth embodiment;

FIG. 29 is another schematic illustrating the routing process according to the fifth embodiment;

FIG. 30 is another schematic illustrating the routing process according to the fifth embodiment;

FIG. 31 is another schematic illustrating the routing process according to the fifth embodiment;

FIG. 32 is another schematic illustrating the routing process according to the fifth embodiment;

FIG. 33 is another schematic illustrating the routing process according to the fifth embodiment;

FIG. 34 is another schematic illustrating the routing process according to the fifth embodiment; and FIG. 35 is a schematic of a configuration of a quantum cryptographic communication system according to a sixth embodiment.

DETAILED DESCRIPTION

According to an embodiment, a communication device is connected with one or more external devices by quantum communication channels and a classical communication channel, and generates an encryption key with photons exchanged over the quantum communication channel. The communication device includes an acquirer, a calculator, a selector, and a communicating unit. The acquirer is configured to acquire a quantum error rate for each quantum communication channel by which the communication device is connected with the one or more external devices. The calculator is configured to calculate a metric of a first path to each of the one or more external devices based on the quantum error rate. The selector is configured to select, a second path in the classical communication channel to a specific one of the one or more external devices based on the metric. The communicating unit is configured to transmit an application key to the specific one of the one or more external devices over the second path.

A communication device, a communication system, and a computer program according to some embodiments will now be explained in detail with reference to the appended drawings. In the drawings described below, the same parts are assigned with the same reference numerals. These drawings are, however, schematic representations, and the relation between the thickness and the dimensions in a plan view, the ratio between the thicknesses of respective layers, and the like may be different from those in actual implementations. Therefore, the specific thicknesses and dimensions should be determined in consideration of the description below.

In the quantum key distribution, Open Shortest Path First (OSPF) is sometimes used as a protocol (routing protocol) for determining a path (route) for sharing an encryption key (application key). OSPF uses distance (the sum of the costs of the respective links included in a target path) as a metric for performing routing (route control).

A node in the quantum cryptographic communication system shares a link key with another node connected over a link. Some of the nodes included in the quantum cryptographic communication system share application keys using a key-sharing network. Because such nodes use a link key as a one-time pad, that is, because the nodes discard a link key having been used once, link keys become quickly consumed when application keys are encrypted and exchanged using link keys. It is therefore impossible to share and to transfer application keys at a rate higher than the rate at which link keys are shared. When nodes share application keys via a plurality of nodes, the rate for sharing the application keys is restricted by the link with the least link keys, or the link sharing link keys at the lowest rate.

Let us now shift our focus on the quantum bit error rate (QBER) (quantum error rate) of a link (quantum communication channel) in the quantum cryptographic communication system. When an eavesdropper observes photons exchanged over a quantum communication channel, the QBER is increased because the states of the photons change. In other words, it is more likely for a link with a higher QBER to have a link key stolen by an eavesdropper. It is also preferable to avoid routing an application key over a classical communication channel that follows the same path as a quantum communication channel having been possibly eavesdropped by an eavesdropper. From the viewpoint of security against eavesdropping, it is therefore preferable not to include a link that is more likely to be eavesdropped by an eavesdropper in a path to be used for sharing application keys.

To address this issue, the communication system according to the embodiments implements a routing algorithm for sharing application keys by avoiding a link that is more likely to have been eavesdropped by an eavesdropper, that is, by avoiding a link with a high QBER. In this manner, security against eavesdropping can be improved.

For example, the communication system according to the embodiments described below uses an algorithm that calculates a QBER-based metric that uses a QBER of a link (quantum communication channel) as a cost, as a part of the routing protocol. In this manner, a path with higher security against eavesdropping can be selected, by using a QBER-based value as a metric for selecting a path (path selection), with a QBER serving as a cost. A communication system according to one of the embodiments described below (fifth embodiment) uses a hop count as another metric. In this manner, the communication system can select a path in which consumption of the link keys can be suppressed considering a system as a whole, by reducing the number of links routed.

Each node making up the key-sharing network exchanges a QBER of a link connected to the node and network information with another node. To select a path for sharing an application key, each of the nodes calculates a QBER-related metric (and a hop count). When a QBER-related metric is used in selecting a path, the node selects a path that is more secure against eavesdropping, by using an algorithm described below. When a QBER-related metric and a hop count are used to select a path, the node selects a path with higher security against eavesdropping and consuming less link keys, using the algorithm described below.

The QBER-related metric and the hop count are separate metrics, and these metrics have several variations depending on how these metrics are evaluated and weighted. A node selects a path with higher security against eavesdropping and consuming less link keys using either a protocol (A) or a protocol (B) below, for example.

(A) Select one of a plurality of paths using a hop count as a metric, when the QBER-related metrics of the respective paths are equal.

(B) Select a path using one metric that takes both of a QBER-related metric and a hop count into consideration.

The nodes may also be triggered to execute the routing protocol again when the QBER changes greatly.

The QBER-related metric s used as a first parameter of the metric, and the hop count is evaluated as a second parameter, but these parameters may be evaluated in the opposite order. In other words, a node may perform routing using a hop count as a metric, and then evaluate a QBER-related metric when a plurality of links have the same hop count. It is also possible to adjust the degree by which the QBER-related metric and the hop count are reflected to one metric of path. This adjustment can be achieved by calculating one metric by weighting the QBER-related metric and the path hop count, for example. Furthermore, the key generation speed or the number of stored keys may also be used as a cost and reflected to the metric, in addition to the QBER-related metric.

Consideration of a QBER-related metric contributes to the improvement of security against eavesdropping, and consideration of a hop count as a metric contributes to the suppression of link key consumptions across the entire system, as mentioned earlier. Therefore, different metrics may be used depending on the application in which the quantum cryptographic communication system is used.

First Embodiment

Figure 1:
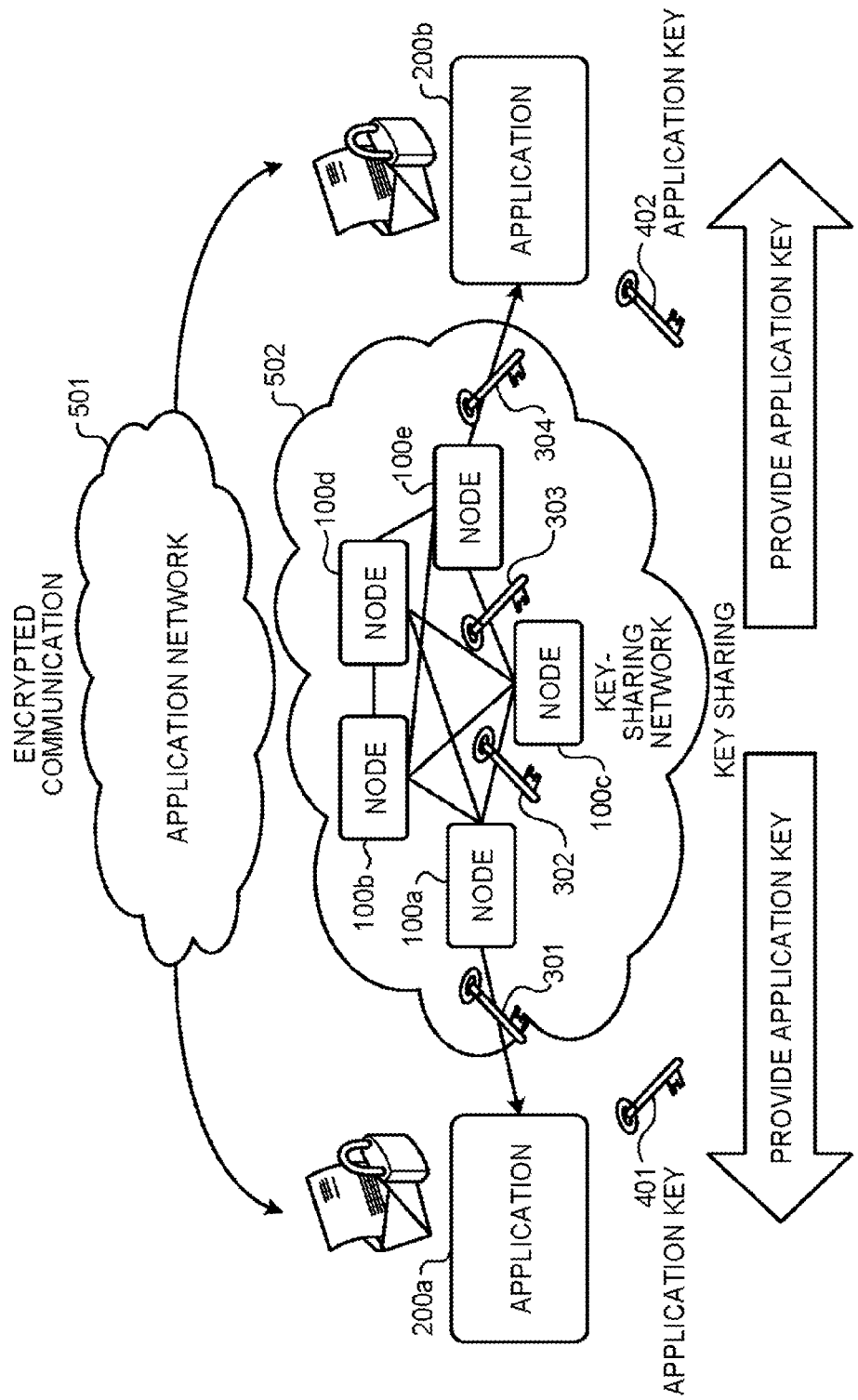
FIG. 1 is a schematic of a configuration of a quantum-cryptographic communication system.

FIG. 1 is a schematic illustrating an exemplary configuration of a quantum cryptographic communication system. FIG. 1 illustrates an example in which the nodes and the applications are implemented independently. As illustrated in FIG. 1, the quantum cryptographic communication system includes nodes 100a to 100e that are communication devices and applications 200a and 200b.

Each of the nodes 100a to 100e shares link keys (e.g., link keys 302 and 303) with another node (external device) connected via a link, over a key-sharing network 502. Some of the nodes generate an encryption key that is a random number as an application key, independently from the links, and provide the encryption key to the applications. For example, the node 100a and the node 100e generate an encryption key 301 and an encryption key 304 that are random numbers, respectively, independently from the links, and provide the encryptions keys to the applications 200a and 200b, respectively, as the application keys 401 and 402. The applications 200a and 200b establish encrypted communication over an application network 501, using the application keys (application keys 401 and 402).

Hereinafter, the nodes 100a to 100e are sometimes simply referred to as nodes 100 when the nodes 100a to 100e do not need to be distinguished from one another, and the applications 200a and 200b are sometimes simply referred to as applications 200 when the applications 200a and 200b do not need to be distinguished from one another.

The number of the nodes 100 is not limited to five as illustrated in FIG. 1. Furthermore, the number of the applications 200 is not limited to two as illustrated in FIG. 1.

Each of the nodes 100a to 100e has a function for generating and sharing a random number with another node connected over a link, and a function for establishing encrypted communication over the key-sharing network 502, using the generated random number as a link key, as described earlier. Each of the nodes 100 may also have a function for generating a random number independently from the links, and a function for transmitting the generated random number to another node.

Figure 2:
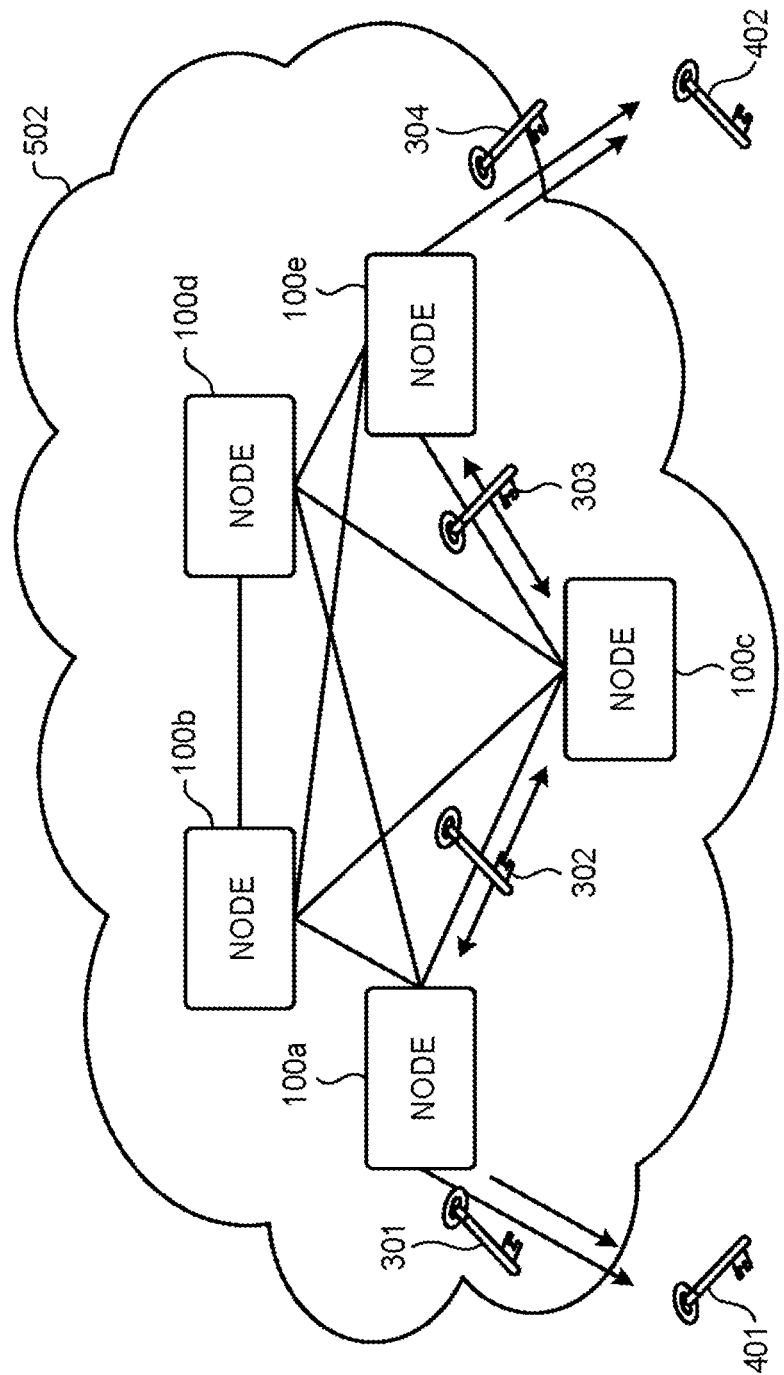
FIG. 2 is a schematic for explaining how application keys are shared via a key-sharing network.
Figure 3:
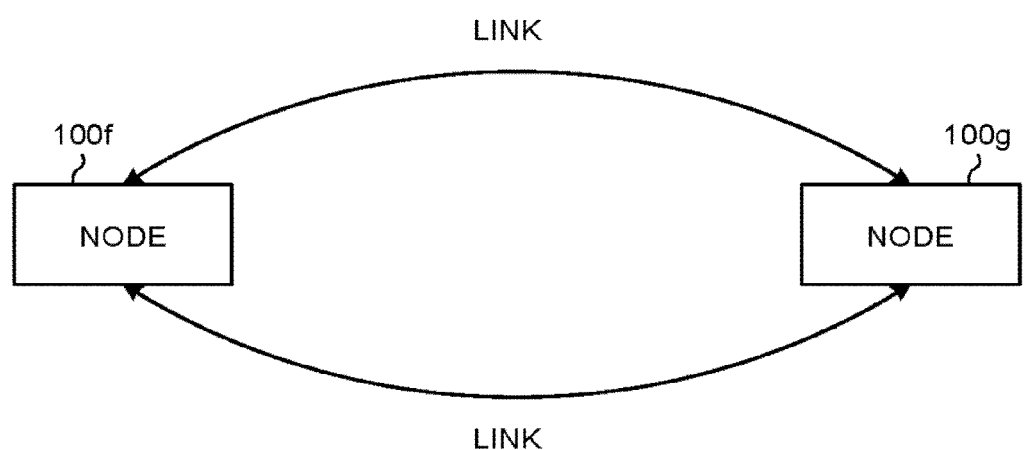
FIG. 3 is a schematic of the smallest unit of the key-sharing network.

FIG. 2 is a schematic for explaining how application keys are shared over the key-sharing network. FIG. 3 is a schematic of the smallest unit of the key-sharing network. As mentioned earlier, a link key is generated between one node 100 and another node 100. In the example illustrated in FIG. 2, a link key 302 is shared between the node 100a and the node 100c, and a link key 303 shared between the node 100c and the node 100e.

In the example illustrated in FIG. 2, the node 100a generates the encryption key 301 that is a random number independently from the links, and provides the encryption key to the application 200a as the application key 401. The node 100e generates the encryption key 304 that is a random number independently from the links, and provides the encryption key to the application 200b as the application key 402. These nodes 100 then perform the routing to share the application keys. These nodes 100 shares (transfers) the application keys using corresponding link keys via a path determined by the routing protocol. In the example illustrated in FIG. 2, the application keys are shared between the node 100a and the node 100e so that the application keys 401 and 402 are provided.

An example of the smallest network unit of the key-sharing network 502 consists of two nodes that are a node 100f and a node 100g connected to each other, as illustrated in FIG. 3. The one node 100 and the other node 100 are illustrated to be connected via one link (a pair of a classical communication channel and a quantum communication channel) in FIG. 2, but the embodiment is not limited thereto. For example, these two nodes (nodes 100f and 100g) may be connected to each other via a plurality of links as illustrated in FIG. 3 (two, in the example illustrated in FIG. 3).

Figure 4:
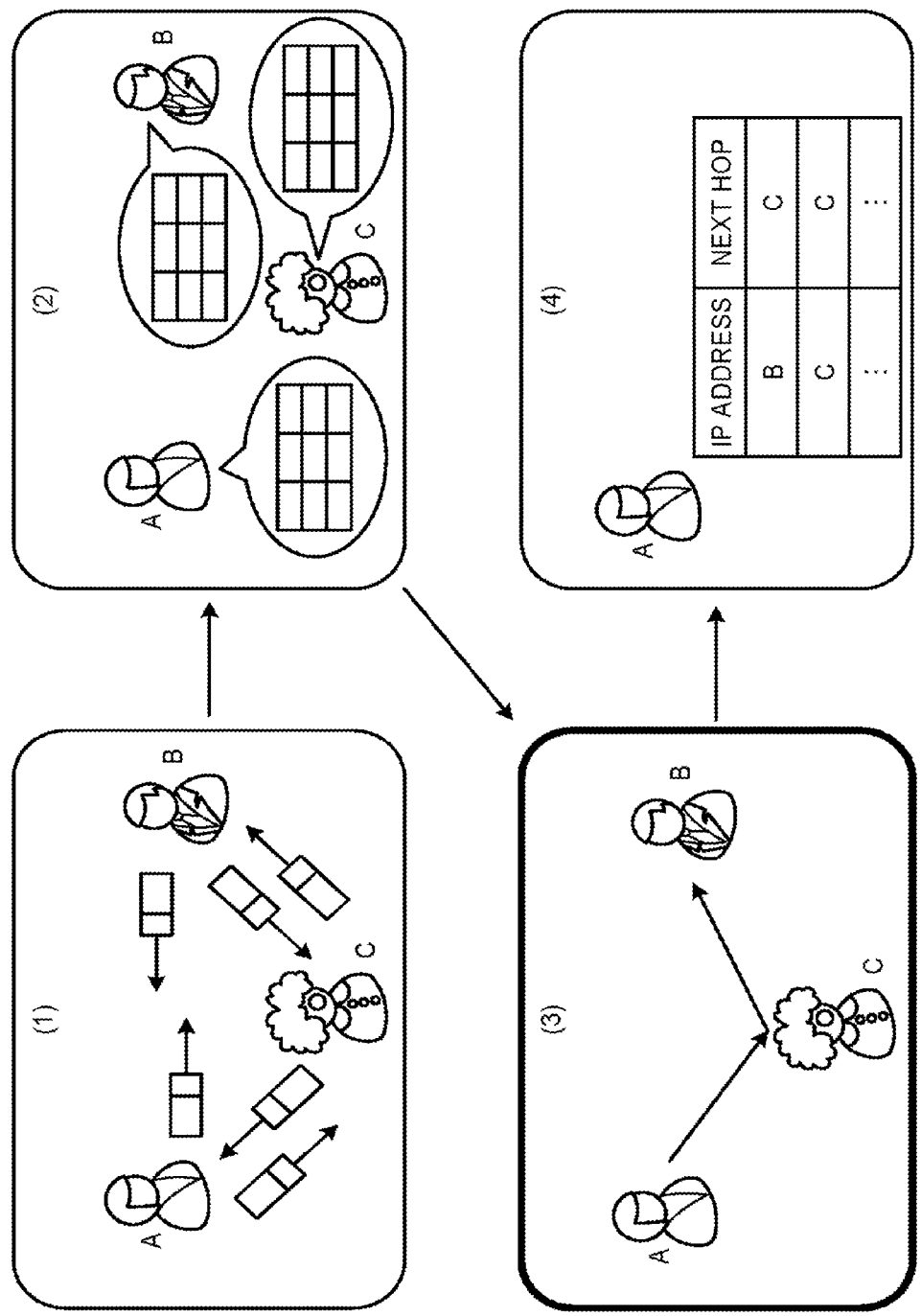
FIG. 4 is a schematic of an exemplary Open Shortest Path First (OSPF) process.

FIG. 4 is a schematic of an exemplary OSPF process. Explained now with reference to FIG. 4 is a process of creating a routing table for a key-sharing network, using OSPF which is a conventional routing protocol.

According to OSPF, the node 100 transmits a message called a link state, and shares information, such as the state of a link to which the node 100 is connected, the network address of the link, the cost of each link, with the other nodes 100. The link state contains information (network information) related to how the node 100 is connected to which one of the other nodes 100. Each of the nodes 100 receiving the link state recognizes the network configuration based on the link state, and creates a table representing the network configuration (link state database). Each of the nodes 100 then creates a shortest-path tree with an origin at that node from the link state database, using a Dijkstra algorithm, and creates a routing table.

Each of the nodes 100 follows Steps (1) to (4) illustrated in FIG. 4 to create a routing table and perform the routing using OSPF.

(1) Share link states with the other nodes 100. A link state includes information such as the state of the link to which the node 100 is connected, the network address, and costs of each of the links.

(2) Create a table representing the network configuration (link state database) based on the link states.

(3) Create a shortest-path tree originating from that node using the Dijkstra algorithm, from the link state database.

(4) Create a routing table from the shortest-path tree (e.g., a table mapping an internet protocol (IP) address to a next hop).

The basic steps for creating a routing table in the key-sharing network are as described above. The first embodiment is mainly focused on the creation of the shortest-path tree at Step (3). In the first embodiment, however, an optimal path tree with high security against eavesdropping is created, instead of a shortest-path tree related to the distance. The other Steps (1), (2), and (4) can be performed following the same steps as those in the conventional process, except that the information shared at Step (1) contains some information specific to the first embodiment, which will be described later.

Calculations of a cost and a metric in the routing protocol according to the first embodiment will now be explained. The following types of data correspond to each link and each node 100 included in the key-sharing network 502.

Cost-Related Data Mapped to Link:
  a QBER
  a count rate
  the number of bits in a key after the sifting process
  the number of bits in the key after the error correction
  the number of bits in the generated encryption key Data Mapped to Node 100:
  a database representing a network configuration (link state database)
  determined optimal path tree information
  QBER-related metrics from the origin to other nodes 100
  hop counts from the origin to the other nodes 100
  next hop A QBER is a representation of an error rate in the bit information exchanged between the nodes 100 in the quantum key distribution. The QBER takes different values depending on the link, depending on the configuration parameters of the node 100 operating in a manner connected to the link, effects of the environment, and the presence of an eavesdropper, for example. When the QBER is used as a cost, the QBER is generally calculated by extracting some samples from a bit string that is to serve as a key at some time interval, but the way in which and the interval at which the samples are extracted are not particularly designated. Furthermore, the calculation scheme may be decided based not only on the QBER of the extracted samples, but also on the amount of change in the QBER up to the point at which the QBER is calculated, and on the actual QBERs observed from when the quantum key distribution has been started.

A QBER also serves as a reference for detecting eavesdropping on a link (quantum communication channel) in the quantum key distribution. When a QBER exceeds a threshold, the link is determined as being eavesdropped. A source node encodes the information of bits that are to serve as a key onto the photons, and transmits the photons encoded with the bit information to the destination node. When an eavesdropper observes the photons, the polarizations of the photons change based on the principles of the quantum mechanics, and the probability at which the destination node receives the correct bit information is decreased, and the QBER is increased. A noise introduced during the process of exchanging the photons may also increase the QBER, but there is no way to distinguish whether an increase of a QBER is attributable to the presence of an eavesdropper or a noise. Therefore, every QBER increase is considered to be effect of the presence of an eavesdropper. When the QBER has increased, an eavesdropper may have gained an access to information of a large number of bits. Furthermore, to correct the errors in the bit information, the source node and the destination node need to exchange some data via the classical communication channel during the error correction. The information leakage to the eavesdropper is therefore further increased. The QBER threshold is determined considering the amount of information possibly leaking to an eavesdropper, and the security strength of the link keys. In other words, if the quantum key distribution is performed with a QBER equal to or higher than the threshold, the security of the generated link keys cannot be ensured, so the shared bits are discarded as they are.

On a path having a QBER exceeding the threshold and being quite likely to have an eavesdropper, not only the link keys but also application keys, which are routed on the classical communication channel using a link key, may be stolen. On such a path, even if an application key is encrypted with a link key not having been eavesdropped, an application key may leak to an eavesdropper on the classical communication channel, if the application key is encrypted using a link key that is not a one-time pad.

Furthermore, if the quantum communication channel and the classical communication channel are multiplexed onto one optical fiber with the WDM technology, an eavesdropper may steal the application key in the wavelength band of the classical communication via the optical fiber. In such a case, photons exchanged over the quantum communication channel may be affected and cause the QBER to increase, so it is necessary to monitor the QBER using a threshold. Furthermore, when the QBER is low, the probability of bits being inverted is also low. The source and the destination nodes can therefore share a larger number of bits, so that a greater number of link keys can be generated. When the QBER is high, the probability of bits being inverted is also high. Therefore, the source and the destination nodes can share a smaller number of bits, so that a smaller number of link keys are generated. With the routing algorithm according to the first embodiment, therefore, a path not only being less likely to have an eavesdropper but also being capable of generating a greater number of link keys can be selected.

As described above, each of the nodes 100 retains a link state database representing the network configuration (connection relations) in the corresponding area, as the information required for calculating the optimal path. Each of the nodes 100 also retains determined optimal path tree information, QBER-related metrics from the origin to the respective other nodes 100, and hop counts and the next hops from the origin to the respective other nodes 100.

The determined optimal path tree information is information representing, for each of the external devices (the other nodes 100), whether the optimal path to that node 100 has been determined. If not, the path to the node 100 is represented as merely an optimal path candidate. At this time, the optimal path is a path with the best metric from the specific node to another node 100. For example, when used is a QBER-related metric, a path from that node to another node 100 that is most secure against eavesdropping is considered as the optimal path.

A QBER-related metric from an origin to another node 100 is a value calculated for a QBER as a cost of a link in the case of reaching the other node 100 via the optimal path candidate.

The hop count from the origin to another node 100 represents a hop count required to reach the other node 100 via the optimal path candidate. The QBER-related metric from the origin to the other node 100 and the hop count from the origin to the node 100 are retained for each of the other nodes 100.

The next hop represents the next hop in the optimal path candidate.

While the Dijkstra algorithm that is used in OSPF uses distance as a metric, the routing protocol according to the first embodiment uses a value calculated from a QBER of a path as a metric, instead of distance. A value calculated from a QBER is used as a metric, so that a path that is least likely to have an eavesdropper is selected as follows: the QBERs of respective link included in a path between the nodes 100 that are to share an application key are monitored; and the path with the best result of the QBER-based calculation is selected, among those with QBERs equal to or lower than the threshold. Such a metric is also used in the other embodiments described later, as well as in the first embodiment.

The routing algorithm according to the first embodiment uses the sum of the QBERs of the respective links included in an optimal path candidate as a metric. When the sum of QBERs is calculated, the sum of QBERs increases when an optimal path candidate includes a larger number of links. In this manner, the routing algorithm can select a path reflecting the fact that the likeliness of a path having an eavesdropper increases proportionally to an increase of the sum of the QBERs.

Figure 5:
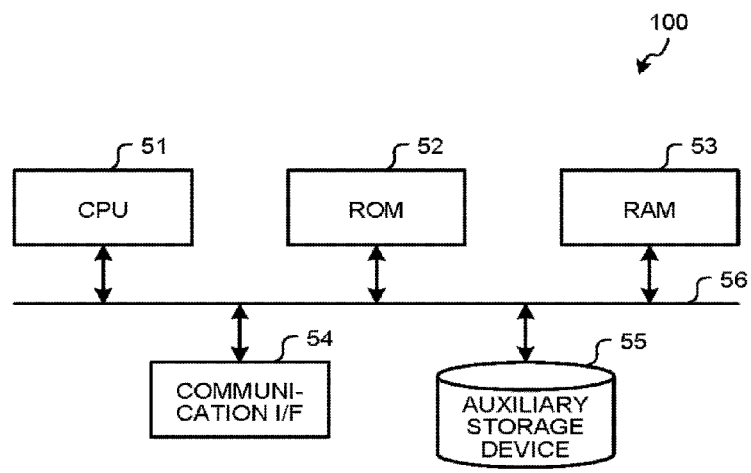
FIG. 5 is a schematic of a hardware configuration of a communication device according to the first embodiment.

FIG. 5 is a schematic illustrating an exemplary hardware configuration of the communication device according to the first embodiment. A hardware configuration of the node 100 that is a communication device will now be explained with reference to FIG. 5.

As illustrated in FIG. 5, the node 100 includes a central processing unit (CPU) 51, a read-only memory (ROM) 52, a random access memory (RAM) 53, and a communication I/F 54, and an auxiliary storage device 55.

The CPU 51 is a device that controls the operation of the entire node 100. The ROM 52 is a non-volatile storage device storing therein a computer program for the node 100. The RAM 53 is a volatile storage device used as a working area of the CPU 51.

The communication I/F 54 is an interface for communicating with other nodes 100. The auxiliary storage device 55 is a storage device such as a hard disk drive (HDD) or a solid state drive (SSD) storing therein a generated encryption key, for example.

The CPU 51, the ROM 52, the RAM 53, the communication I/F 54, and the auxiliary storage device 55 are communicatively connected to one another via a bus 56 such as an address bus or a data bus.

Figure 6:
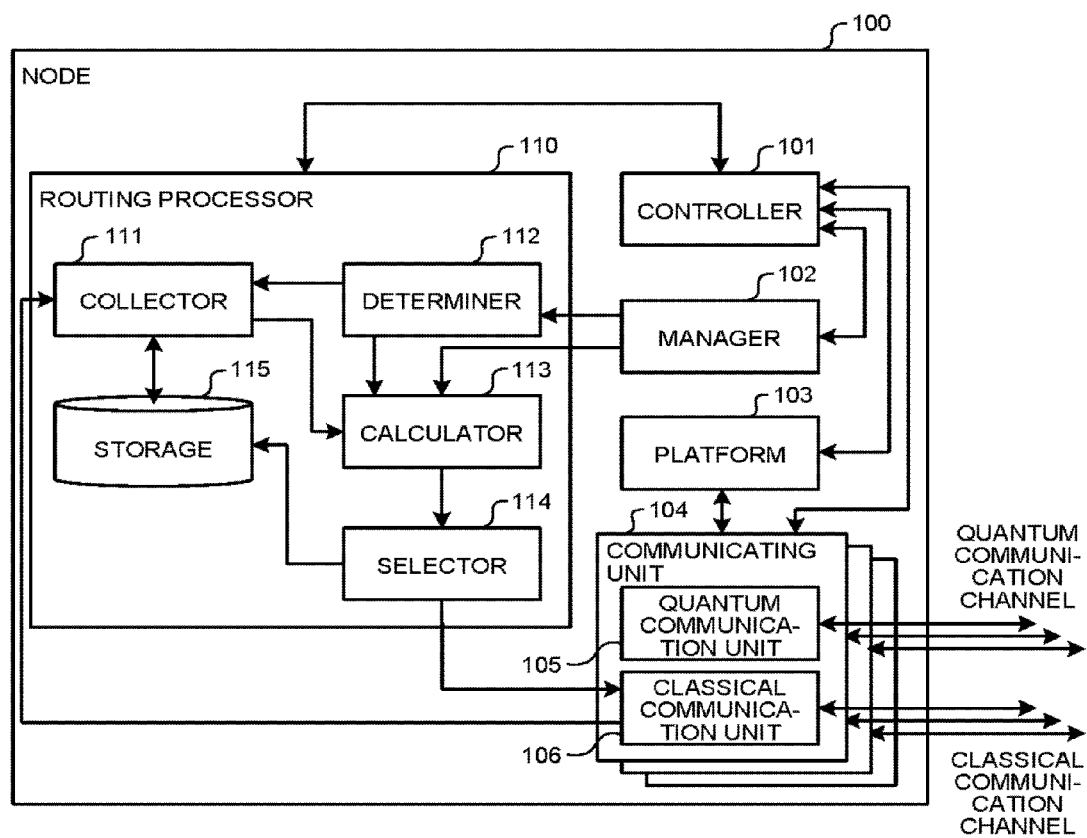

FIG. 6 is a schematic illustrating an exemplary configuration of a functional blocks included in the communication device according to the first embodiment. The configuration of the functional blocks included in the node 100 that is the communication device will now be explained with reference to FIG. 6.

As illustrated in FIG. 6, the node 100 includes a controller 101, a manager 102 (which may be referred to as an acquirer), a platform 103, a communicating unit 104, and a routing processor 110.

The controller 101 is a functional unit that controls processes executed in the node 100. The controller 101 is responsible for starting the functional units, for example. The controller 101 also receives a bit string represented as photons from the quantum communication unit 105 described later, and calculates a QBER, a count rate, and the like. The controller 101 also performs processes such as the sifting process, the error correction, and a privacy amplification process for secrecy enhancing to the photon bit string, and generates an encryption key (a link key or an application key).

The manager 102 is a functional unit that acquires link-related information such as a QBER and a count rate of a link to which the node 100 is connected, the number of bits in a key after the sifting process, the number of bits in the key after the error correction, and the number of bits in the generated encryption key, for example, from the controller 101, and manages the link-related information.

The platform 103 is a functional unit for providing functions such as a management function of the other units included in the node 100, an operating system function of the computer required for its operation, a basic network function, and a security function.

The communicating unit 104 is a functional unit for communicating with another node 100 to which the node 100 is connected. The communicating unit 104 is provided for each one of the links, and includes a quantum communication unit 105 and a classical communication unit 106. The communicating unit 104 is implemented as the communication I/F 54 illustrated in FIG. 5.

The quantum communication unit 105 is a functional unit that is connected to another node 100 via a quantum communication channel in a link, and performs quantum communication with the other node 100. The quantum communication unit 105 shares a photon bit string for generating a link key (encryption key) with the node 100 connected via a link, by generating a random number using quantum cryptography.

The classical communication unit 106 is a functional unit that is connected to another node 100 via a classical communication channel in the link, and performs classical communication with the other node 100. An example of data exchanged between the nodes 100 via the classical communication unit 106 includes application key data. Such data is usually transmitted via the classical communication unit 106, over encrypted communication using a link key under the management of the node 100.

The routing processor 110 is a processing unit for executing routing (route control) based on the routing protocol described above. The routing processor 110 includes a collector 111, a determiner 112, a calculator 113, a selector 114, and a storage 115.

The collector 111 is a functional unit for collecting link states including the states of respective links to which the node 100 is connected, the network addresses and costs of the respective links, and network information, via the classical communication unit 106. The collector 111 creates a link state database based on the collected link states, and stores the link state database in the storage 115.

The determiner 112 is a functional unit that compares a QBER managed by the manager 102 with a threshold for detecting eavesdropping (which may be referred to as a first threshold), and determines whether eavesdropping is detected. The determiner 112 passes the result of determining the presence of eavesdropping on a link to the calculator 113, so as not to route any data to the link.

The calculator 113 is a functional unit that calculates a metric of a path (which may be referred to as a first path) for reaching another node 100, from the QBERs managed by the manager 102, by referring to the link state database created by the collector ill. In the first embodiment, the calculator 113 calculates the sum of the QBERs of the respective links included in a path to the other node 100 as a metric.

The selector 114 is a functional unit that selects the optimal path (which may be referred to as a second path) with the best metric from a plurality of candidates of the optimal path, based on the metrics of the respective candidate paths for reaching the other node 100, and creates an optimal path tree. The selector 114 creates a routing table from the optimal path tree, and stores the routing table in the storage 115.

The storage 115 is a functional unit storing therein the link state database created by the collector 111, the routing table created by the selector 114, and the like. The storage 115 is implemented as the auxiliary storage device 55 illustrated in FIG. 5.

Each of the functional units described above (the controller 101, the manager 102, the platform 103, the collector 111, the determiner 112, the calculator 113, and the selector 114) may be implemented by causing a processor such as the CPU 51 illustrated in FIG. 5 to execute a computer program, that is, in software, in hardware such as an integrated circuit (IC), or in a combination of software and hardware.

The configuration of the functional blocks included in the node 100 according to the embodiment is explained above, but the explanation provided above is merely exemplary.

The routing algorithm according to the first embodiment will now be explained in detail. The sequence described below represents a basic sequence of the routing algorithm. Explained below in this example is the process from <Step S1> to <Step S8> for creating an optimal path tree, which is used in creating the routing table, after the nodes 100 share the link states and recognize the network configuration. In the explanation hereunder, a node in an optimal path tree (tree structure) corresponding to each of the nodes 100 that is a communication device is sometimes referred to as a "node" with no reference numeral.

<Step S1> Set an initialization label to all of the nodes.

<Step S2> For each of the nodes that are connected to the origin, calculate the sum of the QBERs to that node. At this time, any link with a QBER exceeding the threshold is not used.

<Step S3> Assign a determinate metric to the node having the smallest QBER sum through the path up to that node, being the smallest among the nodes connected to the origin.

<Step S4> For each of the nodes connected with the node assigned with the determinate metric, calculate a QBER sum through the path from the origin to that node again. At this time, any link with a QBER exceeding the threshold is not used.

<Step S5> If the recalculated QBER sum through the path to the node is smaller than the retained QBER sum, update the QBER sum, and retain the new path. Delete the previous path so as not to use the path.

<Step S6> If the retained QBER sum is smaller than the recalculated QBER sum, retain the current QBER sum and path. Delete the recalculated path so as not to use the path.

<Step S7> Assign a determinate metric to the node having the smallest QBER sum through the path from the origin to that node, being smallest among the nodes with no determinate metric.

<Step S8> Repeat <Step S4> to <Step S7> until the all of the nodes have a determinate metric.

The routing algorithm according to the first embodiment will now be explained. This algorithm uses a sum of QBERs as a metric, instead of distance used as a metric in the Dijkstra algorithm employed in OSPF. To begin with, the notations used in the algorithm will be explained.

s: origin
V: a set of nodes in the entire graph
VP: a set of nodes with a determinate QBER sum
V\VP: a set of nodes with no determinate QBER sum
sum[n]: the sum of the QBERs through the path to a node "n"
cost[l]: a cost of a edge "l"
path[n]=l: the edge "l" being the path to the node "n"
th: a threshold of the QBER An example of the routing algorithm according to the embodiment will now be explained.

<Step S11> Select an origin "s", and set VP: =φ, and sum[s]: =0 (path[s]: =0) to the origin "s". Set sum[v]: =∞ (path[v]: =−1) to the nodes "v" other than the origin "s".

<Step S12> Repeat the following until V=VP is satisfied.

<Step S12a> Find a node "w" where the sum[w]=min{sum[v]|v∈V\VP} is satisfied (Find a node "w" with the smallest QBER sum, among those with no determinate QBER sum through the path up to that node).

<Step S12b> Assume that VP: =VP ∪ {w} (Include the node "w" in a set of nodes with a determinate QBER sum through the path up to that node). Perform the following process to each edge "e"=(w, v) originating from the node "w".

If sum[v]>sum[w]+cost[e], and th>cost[e], then
sum[v]: =sum[w]+cost[e](path[v]: =e)
(Update if the sum of the QBERs through the path to the node "v" (the retained QBER sum) is greater than the addition of the QBER of the edge "e" to the QBER sum through the path to the node "w", and if the QBER of the edge "e" is smaller than the threshold "th".)

As described above, in the routing protocol according to the embodiment, the QBER of a link connecting between the nodes 100 is used as a cost, and a sum of the QBERs through the path from one node 100 to the other node 100 is used as a metric. The routing algorithm then selects a path with the smallest QBER sum that is the smallest metric from the candidates of the optimal path, originating from the node 100 and reaching the other node 100, as the optimal path.

Because the optimal path has the smallest QBER sum, the optimal path is ensured to have better security against eavesdropping, so that encryption keys can be exchanged between the nodes at a higher level of security, compared with the other paths.

Second Embodiment

An operation of the key-sharing network according to a second embodiment will now be explained, with a focus on the difference with that according to the first embodiment. The configuration of the node 100 according to the second embodiment is the same as that according to the first embodiment illustrated in FIG. 6.

The routing algorithm according to the embodiment uses a link with the highest QBER (hereinafter, sometimes referred to as a bottleneck), being the highest among the links included in an optimal path candidate, as a metric. By using the highest QBER that is a bottleneck of the path as a metric, the routing algorithm can select a path reflecting the fact that a path with a larger bottleneck is more likely to have an eavesdropper.

FIG. 7 is a schematic for explaining the metric. A sum of the costs in a path and a bottleneck will now be explained with reference to FIG. 7.

Considering a path from a node "s" to a node "t", the sum of the costs (a sum of the QBERs) of the respective links across the path is used as a metric in the first embodiment. In the second embodiment, however, the highest cost (highest QBER), being the highest among the links included in a path, that is a bottleneck, is used as a metric. In the first embodiment, because the sum of the costs (the sum of the QBERs) of the respective links across the path is used as a metric, the metric of the path from the node "s" to the node "t" in FIG. 7 is calculated as 4+3+8=15. In the second embodiment, however, because the highest cost (highest QBER) among the respective links across the path, that is the bottleneck, is used as a metric, the metric will be max{4, 3, 8}=8. The routing algorithm according to the second embodiment can be implemented in the same manner as the routing algorithm according to the first embodiment described above. In other words, among the optimal path candidates from a node 100 to another node 100, the routing algorithm according to the second embodiment selects a path with the smallest bottleneck, which is a metric, as the optimal path.

As described above, the routing protocol according to the second embodiment uses the QBER of the link connecting between the nodes 100 as a cost, and uses the highest one of the QBERs (bottleneck) of the respective links across a path from one node 100 to another node 100 as a metric. The routing algorithm then selects a path with the smallest bottleneck that is the smallest metric from the optimal path candidates from the node 100 to the other node 100. Because the optimal path has the smallest bottleneck, the optimal path is ensured to have better security against eavesdropping, and encryption keys can be exchanged between the nodes more securely, compared with the other paths.

Third Embodiment

An operation of a key-sharing network according to a third embodiment will now be explained, with a focus on the difference with that according to the first embodiment. The configuration of the node 100 according to the third embodiment is the same as that according to the first embodiment illustrated in FIG. 6.

The routing algorithm according to the third embodiment uses the lowest QBER (hereinafter, sometimes referred to as the best), among the links included in an optimal path candidate, as a metric. By using the lowest QBER that is the best as a metric, the routing algorithm can select a path reflecting the fact that a path with the smaller best is least likely to have an eavesdropper.

In the first embodiment, looking at the path from the node "s" to the node "t" in FIG. 7 mentioned earlier, the sum of the costs (the sum of the QBERs) of the respective links across the path is considered as a metric of the path. In the third embodiment, the smallest one of the costs (the lowest QBER), that is, the best of the respective links across the path is considered as a metric. In the first embodiment, because the sum of the costs (the sum of the QBERs) of the respective links across the path is used as a metric, the metric of the path from the node "s" to the node "t" illustrated in FIG. 7 is calculated as 4+3+8=15. By contrast, in the third embodiment, because the best that is the smallest one of the costs (the lowest QBER) of the respective links across the path is used as a metric, the metric will be min{4, 3, 8}=3. The routing algorithm according to the third embodiment can be implemented in the same manner as the routing algorithm according to the first embodiment described above. In other words, the routing algorithm according to the third embodiment selects a path with the lowest best that is a metric, from the optimal path candidates from one node 100 to another node 100.

As described above, the routing protocol according to the third embodiment uses the QBERs of the respective links connecting the nodes 100 as a cost, and uses the lowest one (the best) of the QBERs of the respective links across the path from the node 100 to the other node 100 as a metric. The routing algorithm then selects a path with the lowest best that is the lowest metric as the optimal path, among the optimal path candidates from the node 100 to the other node 100. Because the optimal path has the lowest best, the optimal path is ensured to have better security against eavesdropping, and encryption keys can be exchanged between the nodes more securely, compared with the other paths.

Fourth Embodiment

An operation of a key-sharing network according to a fourth embodiment will now be explained, with a focus on the difference with that according to the first embodiment. The configuration of the node 100 according to the fourth embodiment is the same as that according to the first embodiment illustrated in FIG. 6.

FIG. 8 is a schematic for explaining how an average QBER is calculated in the fourth embodiment. The way in which an average QBER, which is a metric used in the fourth embodiment, is calculated will now be explained with reference to FIG. 8.

Considering the path from the node "s" to the node "t" that are the nodes 100, the routing algorithm according to the first embodiment uses the sum of the QBERs of the respective links across a path as a metric of the path. The routing algorithm according to the fourth embodiment, however, uses a weighted average of the QBERs (hereinafter, referred to as an average QBER) (average quantum error rate) of the respective links across an optimal path candidate as a metric. In calculating the average QBER that is a metric, count rates of the respective links are used as an additional cost, in addition to the QBERs of the respective links. A count rate herein is a bit rate of photons transmitted by a node 100. In FIG. 8, the QBER of a link on the way from the node "s" to the node "t" is indicated above the link, and the count rate of the link is indicated below the link. In the example illustrated in FIG. 8, the average QBER is calculated as (4×10000+3×20000+8×6000)/(10000+20000+6000)=4.1 [%], and therefore the average QBER of the path from the node "s" to the node "t" is determined as 4.1 [%]. By using the average QBER of a path as a metric, the routing algorithm can select a path reflecting the fact that a path with a larger average QBER is more likely to have an eavesdropper.

The node 100 according to the fourth embodiment has the same configuration of the functional blocks as that illustrated in FIG. 6 in the first embodiment, but the difference in the functions of the respective functional blocks will now be explained.

The calculator 113 refers to the link state database created by the collector 111, and calculates an average QBER of the path to another node 100 based on Equation (1) below, using the QBERs and the count rates managed by the manager 102.

$$qber_p = \frac{\sum_{i=1}^{n} e_i c_i}{\sum_{i=1}^{n} c_i} = \frac{e_1 c_1 + e_2 c_2 + \ldots + e_n c_n}{c_1 + c_2 + \ldots + c_n} \quad (1)$$

where $qber_p$ denotes the average of the QBERs of the respective links across a path "p"; "n" denotes the number of links included in the path "p"; $e_i$ denotes the QBER of a link "i", and $c_i$ denotes the count rate of the link "i".

FIG. 9 is a schematic of an exemplary network configuration according to the fourth embodiment. FIGS. 10 to 19 are schematics illustrating a routing process according to the fourth embodiment. A specific example of the routing operation of the selector 114 will now be explained with reference to FIGS. 9 to 19. In the explanation below, the network configuration illustrated in FIG. 9 is used as an example.

In this example, the threshold of a QBER that is a cost is set to "10" so that a link with a QBER of "10" or higher is not selected to be included in a path. The number given to a node (the number in a circle) represents a node number. Illustrated in FIGS. 10 to 19 is an example in which an application key is transferred from the node 1 to the node 6. The number given to a link (the number in a rectangle) represents a cost corresponding to the link (QBER/count rate). The number indicated near a node represents a metric of the path for reaching that node (average QBER). A node represented by a double circle is a node having an optimal path determined for reaching that node. Explained herein is a process for creating an optimal path tree, which is used in creating the routing table, after the nodes share the link states and recognize the network configuration. In the example illustrated in FIGS. 9 to 19, communication is explained to be a unidirectional, but the optimal path tree can be calculated in the same manner even when the communication is bidirectional.

To begin with, the metric for reaching each of the nodes is initialized as "∞" (FIG. 10). For the node 1, which is an origin node (hereinafter, also referred to as an "origin node 1"), an optimal path is determined to have a metric of "0".

The node 2 connected to the node 1 has a QBER that is a cost of "16" that is equal to or higher than the threshold "10". Therefore, the corresponding link is excluded from the optimal path candidates, and the cost of the link is left as "∞". The node 3 connected to the node 1 is then given a metric of "2" (FIG. 11).

For the node 3, which has the best metric of the node 2 and the node 3, an optimal path is determined to have a metric of "2" (FIG. 12). The nodes with a determinate metric now include the node 1 and the node 3, and the next hop from the origin node 1 to the destination node 3 is then established as the node 3.

The metric (average QBER) of the node 2 connected to the node 3 is updated to "2.3" (=(2×800+5×100)/(800+100)). The metric (average QBER) of the node 4 connected to the node 3 is updated to "1.9" (=(2×800+1×120)/(800+120)). The metric (average QBER) of the node 5 connected to the node 3 is updated to "2.2" (=(2×800+3×150)/(800+150)) (FIG. 13).

For the node 4, which has the best metric among the node 2, the node 4, and the node 5, an optimal path is determined to have a metric of "1.9" (FIG. 14). The nodes with a determinate metric now include the node 1, the node 3, and the node 4, and the next hop from the origin node 1 to the destination node 4 is then established as the node 3.

The metric (average QBER) of the node 5 connected to the node 4 is calculated as "2.2" (=(2×800+1×120+3×420))/(800+120+420)), but because the metric is the same as that retained in the node 5, the metric is not updated. The metric (average QBER) of the node 6 connected to the node 4 is updated to "3.0" (=(2×800+1×120+6×360)/(800+120+360)) (FIG. 15).

For the node 5, which has the best metric of the node 5 and the node 6, an optimal path is determined to have a metric of "2.2" (FIG. 16). The nodes with a determinate metric now include the node 1, the node 3, the node 4, and the node 5, and the next hop from the origin node 1 to the destination node 5 is then established as the node 3.

The metric (average QBER) of the node 6 connected to the node 5 is updated to "2.6" (=(2×800+3×150+4×320)/(800+150+320)) (FIG. 17).

At this time, for the node 6, an optimal path is determined to have a metric of "2.6" (FIG. 18). The nodes with a determinate metric now include the node 1, the node 3, the node 4, the node 5, and the node 6, and the next hop from the origin node 1 to the destination node 6 is established as the node 3.

Finally, for the node 2, which has no optimal path determined, an optimal path is determined to have a metric of "2.3" (FIG. 19). The nodes with a determinate metric now include the node 1, the node 3, the node 4, the node 5, the node 6, and the node 2, and the next hop from the origin node 1 to the destination node 2 is established as the node 3.

The optimal paths are eventually determined for all of the nodes, and the creation of the optimal path tree is completed. The optimal path from the node 1 to the node 6, therefore, passes through the node 3 and the node 5 (FIG. 19).

As described above, the routing protocol according to the fourth embodiment uses the QBER and the count rate of the link connecting the nodes 100 as costs, and uses the weighted average (average QBER) of the QBERs of the respective links across a path from the node 100 to the other node 100 as a metric. The routing algorithm then selects a path with the lowest average QBER that is the lowest metric as the optimal path, from the optimal path candidates from the node 100 to the other node 100. Because the optimal path has the lowest average QBER, the optimal path is ensured to have better security against eavesdropping, and encryption keys can be exchanged between the nodes more securely, compared with the other paths.

In the description above, the average QBER serving as a metric of a path in routing is calculated from the QBERs and the count rates serving as costs, but the present invention is not limited thereto. For example, the number of bits in a key after the sifting process, the number of bits in the key after the error correction, and the number of bits in the generated encryption key may be used as a cost in calculating an average QBER.

In the example illustrated in FIG. 19, the path from the node 1 to the node 6 passing through the node 3 and the node 5 is determined as the optimal path, and the metric of the optimal path is "2.6". However, the path from the node 1 to the node 6 passing through the node 3, the node 4, and the node 5, for example, also has a metric of "2.6". In other words, the path with the best average QBER to the node 6, which is the final destination, may be found in plurality. In such a case, from the viewpoint for improving the security against eavesdropping by selecting a path with the lowest average QBER, any one of such paths may be selected as the optimal path. The same thing can be said to the implementations according to the first to the third embodiments.

Fifth Embodiment

An operation of a key-sharing network according to a fifth embodiment will now be explained, with a focus on the difference with that according to the first embodiment.

FIG. 20 is a schematic of a comparative example of a hop count of a path according to the fifth embodiment. A hop count will now be explained with reference to FIG. 20.

When only one of the QBER sum, the bottleneck, the best, and the average QBER is used as a metric, as in the first to the fourth embodiments, there is not any other criteria when a plurality of paths have the same metric. In such a case, a path with a greater hop count might be selected depending on the implementation of the order at which the paths are evaluated, or depending on the target network, and the chances of application keys to be eavesdropped by an eavesdropper is increased from the viewpoint of selecting a path having a greater hop count, that is, selecting a longer path. To address this issue, in the fifth embodiment, in addition to the QBER-related metric (the sum of the QBERs, the bottleneck, the best, and the average QBER), the hop count of a path from the source node to the destination node is used as an additional metric. A path with a smaller hop count can therefore be selected among the paths with the same QBER-related metrics so that the application keys can be transferred more securely.

In FIG. 20, the number given to a node (the number in a circle) represents a node number, and the number given to a link (the number in a rectangle) represents a cost corresponding to the link.

The path A from the node 1 to the node 6 passing through the node 2, the node 3, the node 4, and the node 5 has a bottleneck of "8", and a hop count of "5". By contrast, the path B from the node 1 to the node 6 passing through the node 3 and the node 5 has a bottleneck of "8", but has a hop count of "3". Given these paths, the chances of having an eavesdropper to eavesdrop the application key can be reduced by selecting a path with a smaller hop count. The path B is therefore selected as the optimal path, considering that the application keys can be transferred more securely via the path B having a smaller hop count, than the path A having a greater hop count.

In FIG. 20, the QBER-related metric is assumed to be a bottleneck, but any other QBER-related metric may be used in the same manner.

FIG. 21 is a schematic illustrating an exemplary configuration of functional blocks included in a communication device according to the fifth embodiment. The differences between the configuration of the functional blocks included in a node 100_1 according to the fifth embodiment and that of the node 100 illustrated in FIG. 6 according to the first embodiment will now be explained with reference to FIG. 21.

As illustrated in FIG. 21, the node 100_1 according to the fifth embodiment includes the controller 101, the manager 102, the platform 103, the communicating unit 104, and a routing processor 110a.

The routing processor 110a is a processing unit for executing routing (route control) based on the routing protocol described above. The routing processor 110a includes the collector 111, the determiner 112, a calculator 113a, the selector 114, the storage 115, and a counter 116.

The counter 116 is a functional unit that counts the hop count along a candidate optimal path to a target node.

The calculator 113a is a functional unit that refers to the link state database created by the collector 111, and calculates the metric of a path to another node 100_1, based on the QBERs and the like managed by the manager 102, and the hop count counted by the counter 116.

Specific examples of the metric calculations with the protocol (A) and the protocol (B), respectively, described above are provided below. In the explanation below, the QBER-related metric is assumed to be a bottleneck.

(A1) Have the bottlenecks and the hop counts in separate areas. Compare the hop counts when the bottlenecks are equal.

(B1) Create one calculation formula for calculating one metric that includes a bottleneck (BN) and a hop count (Hop). Two exemplary calculation formulas are provided below.

$$\text{metric}=BN+1/(Hop) \quad (2)$$

$$\text{metric}=BN+(1-Hop/10) \quad (3)$$

For example, when BN=4 and Hop=2, Equation (2) gives a metric of $4+\frac{1}{2}=4.5$, and Equation (3) gives a metric of $4+(1-\frac{2}{10})=4.8$.

In the calculation (A1), the bottlenecks and the hop counts of the respective paths to each of the nodes 100_1 are retained, and the hop counts are compared only if the bottlenecks are equal. In the calculation (B1), a metric calculation formula is prepared in advance, and metrics for the respective paths to each of the nodes 100_1 are calculated using the respective bottlenecks and hop counts.

With the calculations (A1) and (B1), the resultant routing will be the same. The calculation (B1) uses only one metric, in the same manner as in the conventional Dijkstra's algorithm. The calculation (B1) therefore may allow some conventional implementations to be reused. However, with the calculation (B1), exact metric calculations are only possible with a hop count equal to or less than 10.

The metric calculation formulas described above are merely exemplary, and are not limited thereto. Any other formulas may be used, such as those using a result of addition of a weighted bottleneck and a weighted hop count as a metric. In such a case, the coefficients (weights) given to the bottleneck and the hop count may be set arbitrarily.

The configuration of the functional blocks included in the node 100_1 according to the fifth embodiment is explained above, but the explanation provided above is merely exemplary.

The routing algorithm according to the fifth embodiment will now be explained in detail. The sequence described below represents a basic sequence of the routing algorithm. Explained below is a process from <Step S21> to <Step S29> for creating an optimal path tree, which is used in creating the routing table, after the nodes 100_1 share the link states and recognize the network configuration. In the explanation hereunder, a node in the optimal path tree (tree structure) corresponding to each of the nodes 100_1 that is a communication device is sometimes referred to as a "node" with no reference numeral.

<Step S21> Set an initialization label to all of the nodes.

<Step S22> For each of the nodes that are connected to the origin, calculate a bottleneck along the path to that node. At this time, any link with a QBER exceeding the threshold is not used.

<Step S23> Assign a determinate bottleneck to the node with the smallest bottleneck along the path to that node, being the smallest among the paths to the respective nodes connected to the origin.

<Step S24> For each of the nodes that are connected to the node with the determinate bottleneck, recalculate the bottleneck of the path from the origin. At this time, any link with a QBER exceeding the threshold is not used.

<Step S25> If the recalculated bottleneck of the path to the node is smaller than the retained bottleneck, update the bottleneck, and retain the new path. Delete the previous path so as not to use the path.

<Step S26> If the retained bottleneck is smaller than the recalculated bottleneck, retain the current bottleneck and path. Delete the recalculated path so as not to use the path.

<Step S27> If the recalculated bottleneck of the path to the node is equal to the retained bottleneck, calculate the hop count on each of the paths to that node, and retain the path with a smaller hop count.

<Step S28> Assign a determinate bottleneck to the node with the smallest bottleneck along the path to the node, being the smallest among the nodes with no determinate bottleneck.

<Step S29> Repeat <Step S24> to <Step S28> until all of the nodes have a determinate bottleneck.

The routing algorithm according to the fifth embodiment will now be explained. This algorithm uses a bottleneck and a hop count as a metric, instead of distance used as a metric in the Dijkstra's algorithm employed in OSPF. To begin with, the notations used in the algorithm will be explained.
  s: origin
  V: a set of nodes in the entire graph
  VP: a set of nodes with a determinate QBER bottleneck
  V\VP: a set of nodes with no determinate QBER bottleneck
  BN[n]: a bottleneck of the path to a node "n"
  hop[n]: a hop count to the node "n"
  cost[l]: a cost of the edge "l"
  path[n]=l: the edge "l" being the path to the node "n"
  th: the threshold of the QBER An example of the routing algorithm according to the fifth embodiment will now be explained.

<Step S31> Select an origin "s", and set VP: =ϕ, BN[s]: =0, and hop[s]: =0 (path[s]: =0) to the origin "s". Set BN[v]: =∞, and hop[v]: =0 (path[v]: =−1) to the nodes "v" other than the origin "s".

<Step S32> Repeat the following until V=VP is satisfied.

<Step S32a> Find a node "w" where BN[w]=min{BN[v] |v∈V\VP} is satisfied (Find a node "w" with the smallest bottleneck, among the nodes with no determinate bottleneck of the path up to that node).

<Step S32b> Assume that VP: =VP ∪ {w}(Include the node "w" in a set of nodes with a determinate bottleneck along the path up to that node). Perform the following process to each edge "e"=(w, v) originating from the node
  if th>BN[v]>cost[e]>BN[w]
  then BN[v]: =cost[e],
  hop[v]: =hop[w]+1 (path[v]: =e)
  if th>BN[v]>BN[w]>cost[e]
  then BN[v]: =BN[w],
  hop[v]: =hop[w]+1 (path[v]: =e)
(Update if the bottleneck of the path to the node "w" is smaller than the bottleneck retained at the node "v", and if the cost of the edge "e" is smaller than the threshold "th".)
  if th>BN[v]=cost[e]≥BN[w] and hop[v]>hop[w]+1
  then BN[v]: =cost[e],
  hop[v]: =hop[w]+1 (path[v]: =e)
  if th>BN[v]=BN[w]>cost[e] and hop[v]>hop[w]+1
  then BN[v]: =BN[w],
  hop[v]: =hop[w]+1 (path[v]: =e)
(Compare hop counts if the bottleneck of the path up to the node "w" and the bottleneck of the path via the edge "e" are equal and are smaller than the threshold "th". Update if the hop count on the path from the node "w" is smaller than the hop count retained at the node "v".)

FIG. 22 illustrates the routing algorithm according to the fifth embodiment. The first half of <Step S32b> in the algorithm will now be explained with reference to FIG. 22. Let us now consider a link "e"=(w, v) with a source node "w" and a destination node "v".

In FIG. 22, (a) is a schematic of an example in which BN[v]: =cost[e] and hop[v]: =hop[w]+1 (path[v]: =e) if th>BN[v]>cost[e]>BN[w]. In the example illustrated in (a) in FIG. 22, the bottleneck of the path up to the node "w" is "4", the bottleneck of the path for reaching the node "v" without going through the node "w" is "8", and the cost of the link "e" is "6". The path to the node "v" including the link "e" to be newly established has a better (smaller) bottleneck than the current bottleneck "8". Therefore, the link "e" will be the bottleneck, and the bottleneck of the path up to the node "v" is updated to "6". In the manner described above, when the cost of the link is higher than the bottleneck of the source node, the bottleneck of the path for reaching the destination node is updated with the cost of the link.

In FIG. 22, (b) is a schematic of an example in which BN[v]: =BN[w] and hop[v]: =hop[w]+1 (path[v]: =e) if th>BN[v]>BN[w]>cost[e]. In the example illustrated in FIG. 22, (b), the bottleneck of the path up to the node "w" is "6", the bottleneck of the path for reaching the node "v" without going through the node "w" is "8", and the cost of the link "e" is "4". The bottleneck of the path up to the node "v" including link "e" to be newly established has a better (smaller) bottleneck than the current bottleneck "8". At this time, the cost of "4" of the link "e" is not the bottleneck (is smaller than the bottleneck "6" up to the node "w"). Therefore, the bottleneck of the path up to the node "v" is set as "6", which is the same as the bottleneck of the path up to the node "w". In the manner described above, when the bottleneck of the path up to the source node is greater than the cost of the link to be newly established, the bottleneck of the path for reaching the destination node is updated with the bottleneck of the path up to the source node.

In FIG. 22, (c) is a schematic of an example in which the bottleneck of the path for reaching the destination node is not updated. As illustrated in (c) in FIG. 22, when the bottleneck of the path for reaching the node "v" without going through the node "w" is the smallest among the bottlenecks of the path up to the node "w", the cost of the link "e", and the bottleneck of the path up to the node "v", the path including the link "e" cannot be the optimal path, so that the bottleneck is not updated.

FIG. 23 illustrates the routing algorithm according to the fifth embodiment. The second half of <Step S32b> in the algorithm will now be explained with reference to FIG. 23. Let us now consider a link "e"=(w, v) with a source node "w" and a destination node "v".

In FIG. 23, (a) is a schematic of an example in which BN[v]: =cost[e] and hop[v]: =hop[w]+1 (path[v]: =e) if th>BN[v]=cost[e]≥BN[w], and hop[v]>hop[w]+1. As illustrated in (a) in FIG. 23, hop counts are compared if the bottleneck of the path for reaching the node "v" without going through the node "w" and the cost of the link "e" are both "6" and equal, and the bottleneck of the path up to the node "w" is "4" which is smaller than "6". It is assumed herein that, as illustrated in (a) in FIG. 23, the hop count on the path up to the node "w" is "2", and the hop count on the path for reaching the node "v" without going through the node "w" is "5". In such a case, even if the link "e" is passed to reach the node "v" from the node "w", the hop count will be "3" (=2+1), and smaller than the hop count "5" on the path for reaching the node "v" without going through the node "w". Therefore, the path for reaching the node "v" is updated to the path passing through the link "e".

In FIG. 23, (b) is a schematic of an example in which BN[v]: =BN[w] and hop[v]: =hop[w]+1 (path(v): =e) if th>BN[v]=BN[w]>cost[e] and hop[v]>hop[w]+1. As illustrated in (b) in FIG. 23, the hop counts are compared if the bottleneck of the path for reaching the node "v" without going through the node "w" and the bottleneck of the path up to the node "w" are both "6" and equal, and the cost of the link "e" is "4" which is smaller than "6". As illustrated in (b) in FIG. 23, it is assumed herein that the hop count on the path up to the node "w" is "2", and the hop count on the path for reaching the node "v" without going through the node "w" is "5". In such a case, even if the link "e" is passed to reach the node "v" from the node "w", the hop count will be "3" (=2+1), and smaller than the hop count "5" on the path for reaching the node "v" without going through the node "w". Therefore, the path for reaching the node "v" is updated to the path passing through the link "e".

FIG. 24 is a schematic of an exemplary network configuration according to the fifth embodiment. FIGS. 25 to 34 are schematics illustrating the routing process according to the fifth embodiment. A specific example of the routing operation of the selector 114 will now be explained with reference to FIGS. 24 to 34. In the explanation below, the network configuration illustrated in FIG. 24 is used as an example.

In this example, the threshold of a QBER that is a cost is set to "10" so that a link with a QBER of "10" or higher is not selected to be included in a path. The number given to a node (the number in a circle) represents a node number. Illustrated in FIGS. 25 to 34 is an example in which an application key is transferred from the node 1 to the node 6. The number given to a link (the number in a rectangle) represents the cost (QBER) corresponding to the link. The number indicated near a node represents the metric of the path for reaching that node, and represented in a format of [bottleneck-hop count]. A node represented by a double circle is a node having the optimal path for reaching that node determined. Explained herein is a process for creating an optimal path tree, which is used in creating the routing table, after the nodes share the link states and recognize the network configuration. In the example illustrated in FIGS. 24 to 34, communication is explained to be a unidirectional, but the optimal path tree can be calculated in the same manner even when the communication is bidirectional.

To begin with, the metric for reaching each of the nodes is initialized to "∞" (FIG. 25). For the node 1, which is an origin node (hereinafter, also referred to as an "origin node 1"), an optimal path is determined to have a bottleneck of "0" and a hop count of "0".

The node 2 connected to the node 1 has a QBER that is a cost of "16" that is equal to or higher than the threshold "10". Therefore, the corresponding link is excluded from the optimal path candidates, and the cost of the link is left as "∞". The node 3 connected to the node 1 is then given a bottleneck of "2" and a hop count of "1" (FIG. 26).

For the node 3, which has the best bottleneck of the node 2 and the node 3, an optimal path is determined to have a metric of "2" and a hop count of "1" (FIG. 27). The nodes with a determinate metric now include the node 1 and the node 3, and the next hop from the origin node 1 to the destination node 3 is established as the node 3.

The bottleneck and the hop count of the node 2 connected to the node 3 are updated to "5" and "2", respectively. The bottleneck and the hop count of the node 4 connected to the node 3 are updated to "2" and "2", respectively. The bottleneck and the hop count of the node 5 connected to the node 3 are updated to "3" and "2", respectively (FIG. 28).

For the node 4, which has the best bottleneck among the node 2, the node 4, and the node 5, an optimal path is determined to have a bottleneck of "2" and a hop count of "2" (FIG. 29). The nodes with a determinate metric now include the node 1, the node 3, and the node 4, and the next hop from the origin node 1 to the destination node 4 is established as the node 3.

The bottleneck and the hop count of the node 5 connected to the node 4 are calculated as "3" and "3", respectively, but because this hop count is greater than the hop count "2" retained in the node 5, the hop count is not updated. The bottleneck and the hop count of the node 6 connected to the node 4 are updated to "6" and "3", respectively (FIG. 30).

For the node 5, which has the best bottleneck of the node 5 and the node 6, an optimal path is determined to have a bottleneck of "3" and a hop count of "2" (FIG. 31). The nodes with optimal paths determined now include the node 1, the node 3, the node 4, and the node 5, and the next hop from the origin node 1 to the destination node 5 is established as the node 3.

The bottleneck and the hop count of the node 6 connected to the node 5 are updated to "4" and "3", respectively (FIG. 32).

For the node 6, an optimal path is determined to have a bottleneck of "4" and a hop count of "3" (FIG. 33). The nodes with a determinate metric now include the node 1, node 3, the node 4, the node 5, and the node 6, and the next hop from the origin node 1 to the destination node 6 is established as the node 3.

Finally, for the node 2, which has no optimal path determined, an optimal path is determined to have a bottleneck of "5" and a hop count of "2" (FIG. 34). The nodes with a determinate metric now include the node 1, the node 3, the node 4, the node 5, the node 6, and the node 2, and the next hop from the origin node 1 to the destination node 2 is established as the node 3.

The optimal paths are eventually determined for all of the nodes, and the creation of the optimal path tree is completed. The optimal path from the node 1 to the node 6 therefore passes through the node 3 and the node 5 (FIG. 34).

As described above, the routing protocol according to the fifth embodiment uses a hop count as well as a QBER-related metric as metrics. The routing algorithm then selects a path with the best metric and the smallest hop count from the candidates for the optimal path from the node 100 to the other node 100, as the optimal path. Because the optimal path has the best metric, the optimal path is ensured to have better security against eavesdropping, and encryption keys can be exchanged between the nodes more securely, compared with the other paths. Furthermore, even when there are a plurality of paths with the same metric, the path with a smaller hop count is selected as the optimal path. Therefore, the path length of the optimal path can be reduced, so that the security against eavesdropping can be further improved. Furthermore, because the path with a smaller hop count is selected as the optimal path, the number of link keys consumed as a link is passed can be reduced. A generation speed of the link keys or the number of stored link keys may also be used as a cost and reflected to the metric, in addition to the QBER-related metric.

In the specific example of the routing, the QBER-related metric is assumed to be the bottleneck, but the same kind of routing with the hop count can be implemented using the QBER sum, the best, or the average QBER as the QBER-related metric.

Sixth Embodiment

In a configuration in which each of the nodes 100 executes OSPF and retains the routing table, when there are a plurality of paths have the same metrics, the source node may select a route that is different from the route originally intended, and may transmit the key to a receiver that is not on the actually best path. This is because each of the nodes 100 selects the best path from the node 100 itself to the destination node, without selecting the best path from the source node to the destination node.

When such a configuration is not preferable, the source node may send the application key using a technique called source routing, in which the path through which the application key is to be transmitted is designated in advance. In this manner, the source node can cause the intermediary nodes to select the path designated by the source node. The source routing is a technique for allowing the source node to designate the path along which the data should travel, and causing the intermediary nodes to transfer the data following the designated path.

FIG. 35 is a schematic illustrating an exemplary configuration of a quantum cryptographic communication system according to a sixth embodiment. An additional server for managing the routing may be provided, and may designate the path along which the application key should travel. An operation of designating a path using a server will now be explained with reference to FIG. 35. The quantum cryptographic communication system illustrated in FIG. 35 includes a routing management server 600. The routing management server 600 calculates the best path, and reflects the calculated path to the routing table in each of the nodes 100. In this manner, each of the nodes 100 is enabled to select the optimal path.

In the embodiments described above, a QBER, a count rate, the number of bits in a key after the sifting process, the number of bits in the key after the error correction, and the generated encryption key are used as costs of each link for calculating the metric, and the QBER-related metric is calculated using these costs, but the costs are not limited thereto. In other words, any cost other than those described above may be used as the costs for calculating a metric.

The QBER may vary depending on the configuration parameters of the nodes, effects of the natural environment such as in temperature, humidity, and wind velocity, and the presence of an eavesdropper, for example. When a change in the QBER is detected, the routing protocol according to the embodiments may be executed again so that the optimal path is recalculated. A change in the QBER may be detected by, for example, causing the manager 102 to calculate an amount of change between the QBER (which may be referred to as a first quantum error rate) at one time and the QBER (which may be referred to as a second quantum error rate) at another time, and to detect that there is a change when the amount of change is equal to or more than a predetermined threshold (which may be referred to as a second threshold).

The computer program executed on the node (communication device) according to the embodiments is provided incorporated in the ROM 52 or the like in advance.

The computer program executed on the node (communication device) according to the embodiments may be stored in a computer-readable storage medium such as a compact disc read-only memory (CD-ROM), a flexible disk (FD), a compact disc recordable (CD-R), or a digital versatile disc (DVD), as a file in an installable or executable format, and provided as a computer program product.

Furthermore, the computer program executed on the node (communication device) according to the embodiments may be stored in a computer connected to a network such as the Internet, and made available for download over the network. Furthermore, the computer program executed on the node (communication device) according to the embodiments may be provided or distributed over a network such as the Internet.

The computer program executed on the node (communication device) according to the embodiments may cause a computer to function as the units included in the node (communication device) described above. The computer may cause the CPU 51 to read the computer program from the computer-readable storage medium onto the main memory, and execute the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication device that is connected with one or more external devices by quantum communication channels and a classical communication channel, and that generates an encryption key with photons exchanged over the quantum communication channel, the communication device comprising:
a hardware processor configured to function as:
an acquirer configured to acquire a quantum error rate for each quantum communication channel by which the communication device is connected with the one or more external devices;
a calculator configured to calculate a metric of a plurality of paths to each of the one or more external devices based on the quantum error rate in the quantum communication channel; and
a selector configured to select an optimal path in the classical communication channel to a specific one of the one or more external devices based on the calculated metric; and
a communicating interface configured to transmit an application key to the specific one of the one or more external devices over the optimal path in the classical communication channel.

2. The communication device according to claim 1, wherein the metric is a sum of the quantum error rates of the quantum communication channels included in the plurality of paths.

3. The communication device according to claim 1, wherein the metric is a highest one of the quantum error rates of the quantum communication channels included in the plurality of paths.

4. The communication device according to claim 1, wherein the metric is a lowest one of the quantum error rates of the quantum communication channels included in the plurality of paths.

5. The communication device according to claim 1, wherein the metric is an average quantum error rate that is a weighted average of the quantum error rates of the quantum communication channels included in the plurality of paths.

6. The communication device according to claim 5, wherein the calculator calculates the average quantum error rate by taking a weighted average of the quantum error rates, using at least one of a count rate of each of the quantum communication channels included in the plurality of paths, the number of bits in a generated encryption key, and the number of bits in a bit string used in generating the encryption key.

7. The communication device according to claim 1, wherein the calculator is configured to calculate the metric based on at least one of a count rate of each of the quantum communication channels included in the plurality of paths, the number of bits in a generated encryption key, and the number of bits in a bit string used in generating the encryption key.

8. The communication device according to claim 1, wherein the selector selects the optimal path based on the metric and a hop count to the specific one of the one or more external devices.

9. The communication device according to claim 8, wherein the selector selects a path with a most optimal metric as the optimal path, from a plurality of paths over the classical communication channel to the specific one of the one or more external devices, and, when there are a plurality of paths with the most optimal metric, selects a path with a smallest hop count from the paths with the most optimal metric as the optimal path.

10. The communication device according to claim 8, wherein the selector selects a path with a smallest hop count as the optimal path, from a plurality of paths over the classical communication channel to the specific one of the one or more external devices, and, when there are a plurality of paths with the smallest hop count, selects a path with a most optimal metric as the optimal path, from the paths with the smallest hop count.

11. The communication device according to claim 1, the hardware processor further configured to function as a determiner configured to determine whether the quantum error rate is equal to or higher than a first threshold, wherein
the calculator calculates the metric by excluding the quantum communication channel with the quantum error rate determined to be equal to or higher than the first threshold by the determiner, from the plurality of paths.

12. The communication device according to claim 1, wherein
the acquirer acquires a first quantum error rate that is the quantum error rate of the quantum communication channel connecting with the external device, acquires a second quantum error rate that is the quantum error rate of the quantum communication channel connecting with the external device at time different from time at which the first quantum error rate is calculated, and obtains an amount of change between the second quantum error rate and the first quantum error rate, and
when the amount of change is equal to or higher than a second threshold, the calculator recalculates the metric, and the selector selects the optimal path again.

13. A communication system comprising:
a plurality of communication devices each configured to generate an encryption key, wherein
each of the communication devices includes
a hardware processor configured to function as:
an acquirer configured to acquire a quantum error rate for each quantum communication channel by which each of the communication devices is connected with one or more other communication devices;
a calculator configured to calculate a metric of a plurality of paths to each of the one or more other communication devices based on the quantum error rate in the quantum communication channel; and
a selector configured to select an optimal path in a classical communication channel to a specific one of the one or more other communication devices based on the calculated metric; and
a communicating interface configured to transmit an application key to the specific one of the other communication devices over the optimal path in the classical communication channel.

14. A computer program product comprising a non-transitory computer-readable medium containing a program executed by a computer connected with a plurality of external devices, the program causing the computer to execute:
acquiring a quantum error rate for each quantum communication channel by which the computer is connected with the external devices;
calculating a metric of a plurality of paths to each of the external devices based on the quantum error rate in the quantum communication channel; and
selecting an optimal path in a classical communication channel to a specific one of the external devices, as a path for transmitting an application key, based on the calculated metric, to the specific one of the external devices over the optimal path in the classical communication channel.

* * * * *